(12) United States Patent
Mullany

(10) Patent No.: US 8,527,909 B1
(45) Date of Patent: Sep. 3, 2013

(54) MANIPULATING DATA VISUALIZATIONS ON A TOUCH SCREEN

(75) Inventor: Michael Mullany, San Francisco, CA (US)

(73) Assignee: Sencha, Inc., Redwood City, CA (US)

( * ) Notice: Subject to any disclaimer, the term of this patent is extended or adjusted under 35 U.S.C. 154(b) by 0 days.

(21) Appl. No.: 13/482,449

(22) Filed: May 29, 2012

(51) Int. Cl.
*G06F 3/033* (2013.01)
*G06F 3/041* (2006.01)

(52) U.S. Cl.
USPC .......... 715/863; 715/798; 715/800; 715/801; 345/173

(58) Field of Classification Search
USPC .......... 715/863, 762–764, 798–801; 345/173
See application file for complete search history.

(56) References Cited

U.S. PATENT DOCUMENTS

| | | | |
|---|---|---|---|
| 6,016,502 A * | 1/2000 | Haneda et al. | 715/212 |
| 2004/0080531 A1* | 4/2004 | Berstis | 345/738 |
| 2005/0057566 A1* | 3/2005 | Githens et al. | 345/440 |
| 2006/0061780 A1* | 3/2006 | Chen et al. | 358/1.8 |
| 2008/0208462 A1* | 8/2008 | Tanaka | 701/209 |
| 2010/0017740 A1* | 1/2010 | Gonzalez Veron et al. | 715/777 |
| 2010/0162152 A1* | 6/2010 | Allyn et al. | 715/767 |
| 2010/0220113 A1* | 9/2010 | Kennedy | 345/660 |
| 2010/0231595 A1* | 9/2010 | Dang et al. | 345/440 |
| 2011/0164055 A1* | 7/2011 | McCullough et al. | 345/642 |
| 2011/0283231 A1* | 11/2011 | Richstein et al. | 715/810 |
| 2012/0005045 A1* | 1/2012 | Baker | 705/27.2 |
| 2012/0162265 A1* | 6/2012 | Heinrich et al. | 345/661 |
| 2012/0173963 A1* | 7/2012 | Hoke et al. | 715/234 |
| 2012/0180002 A1* | 7/2012 | Campbell et al. | 715/863 |

* cited by examiner

*Primary Examiner* — Tadeese Hailu
(74) *Attorney, Agent, or Firm* — Hickman Palermo Truong Becker Bingham Wong LLP; Adam C. Stone

(57) ABSTRACT

Systems, methods, and devices for interpreting manual touch gestures as input to a touch screen for manipulating computer-generated data visualizations such as column charts, bar charts, and pie charts are provided. According to embodiments of the invention, graphical user interface (GUI) data visualization objects (e.g., column charts, bar charts, pie charts, etc.) displayed on a touch screen may be manipulated by a user performing a variety of different conventional touch gestures directed to the touch screen. The conventional touch gestures are applied in new ways to the data visualization objects of the GUI to enable rich, intuitive, and meaningful manipulation of computer-generated data visualizations.

30 Claims, 31 Drawing Sheets

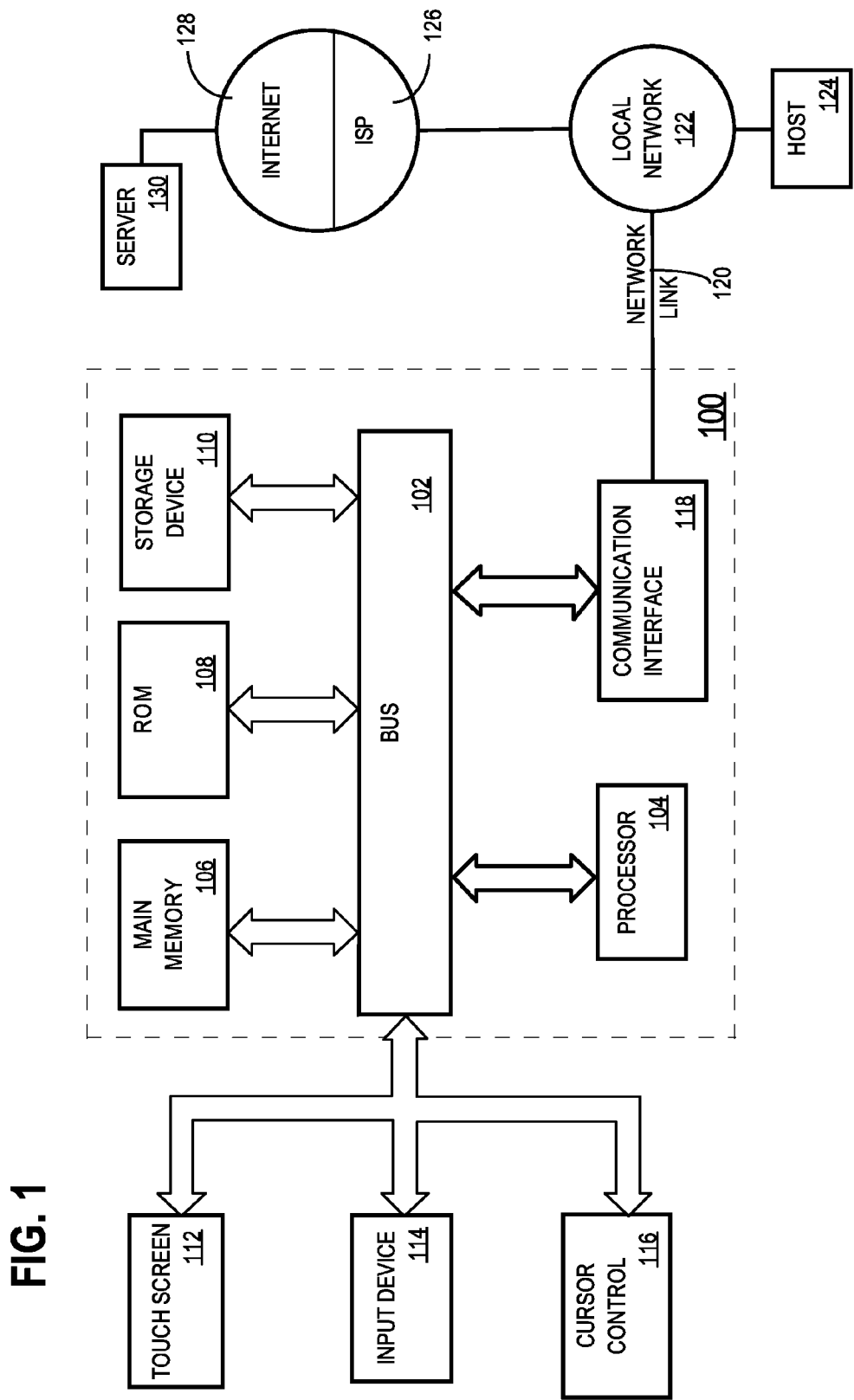

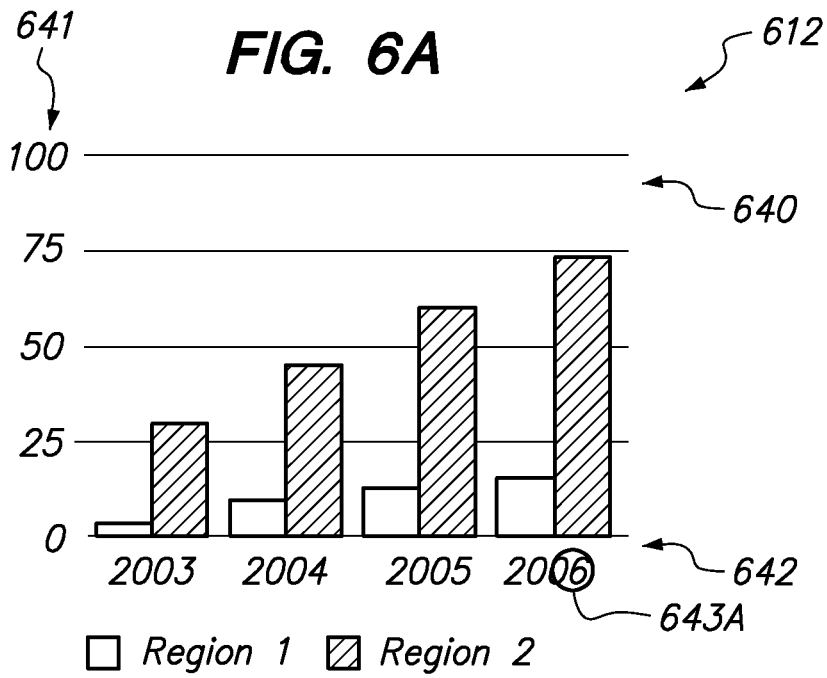
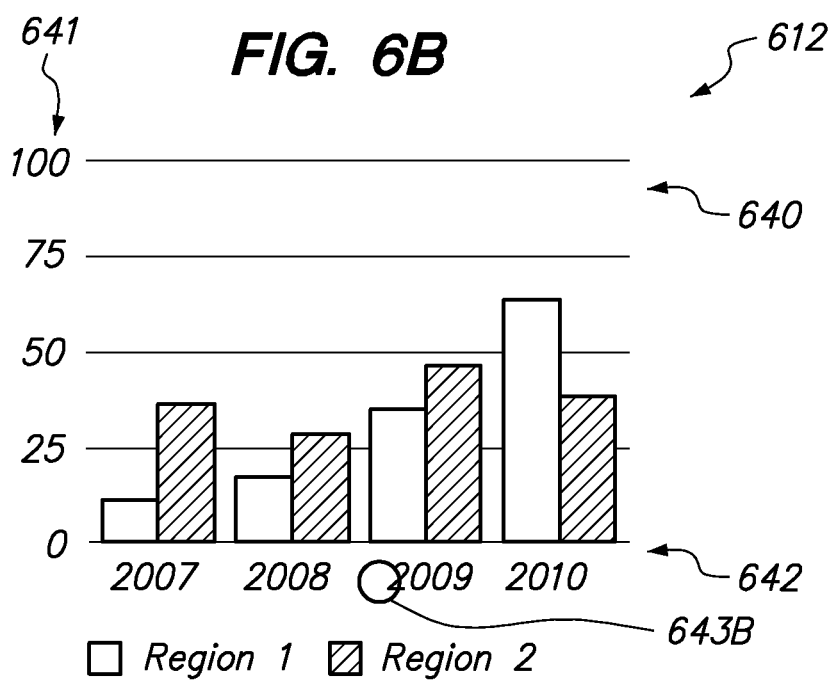

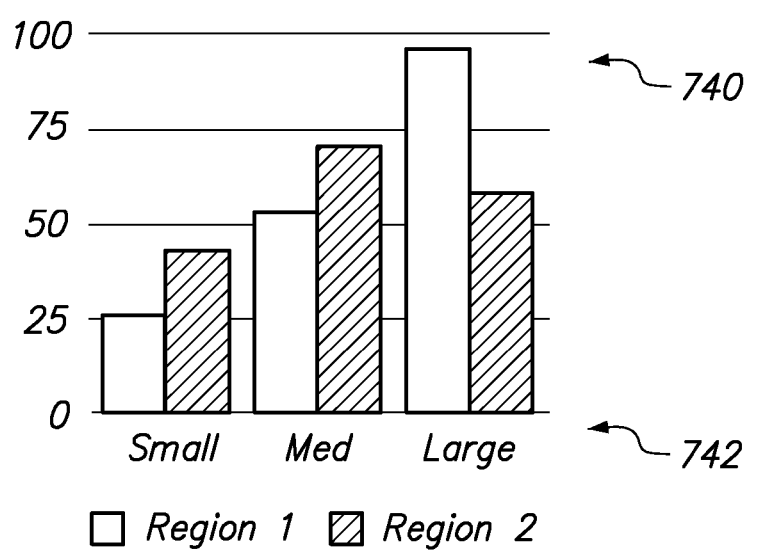
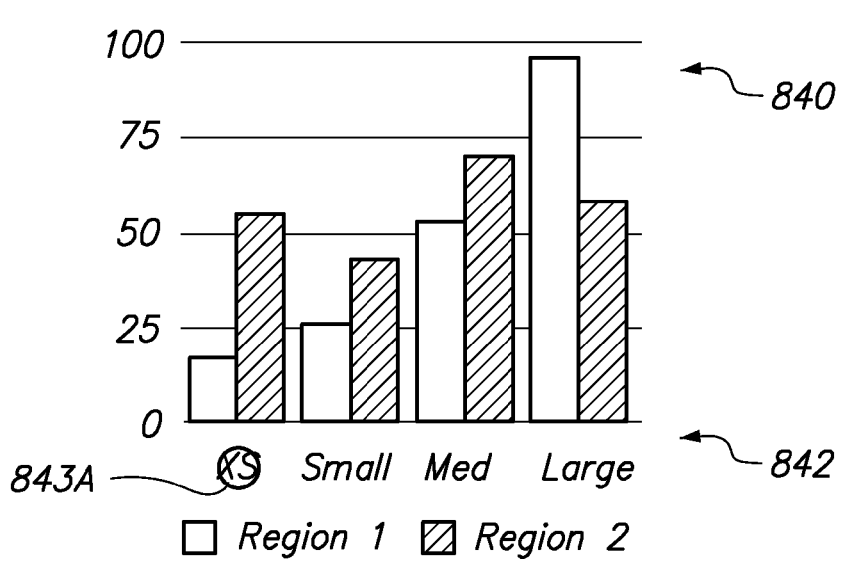

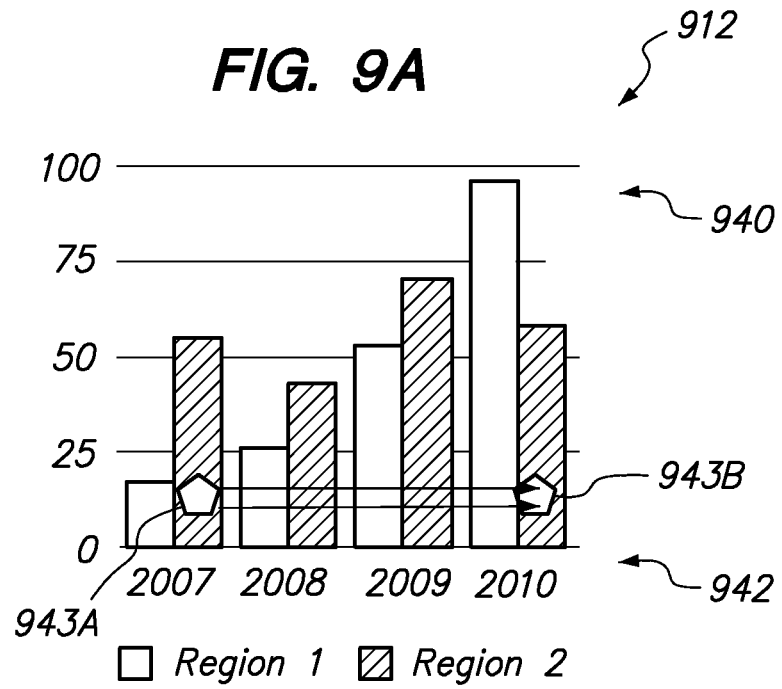
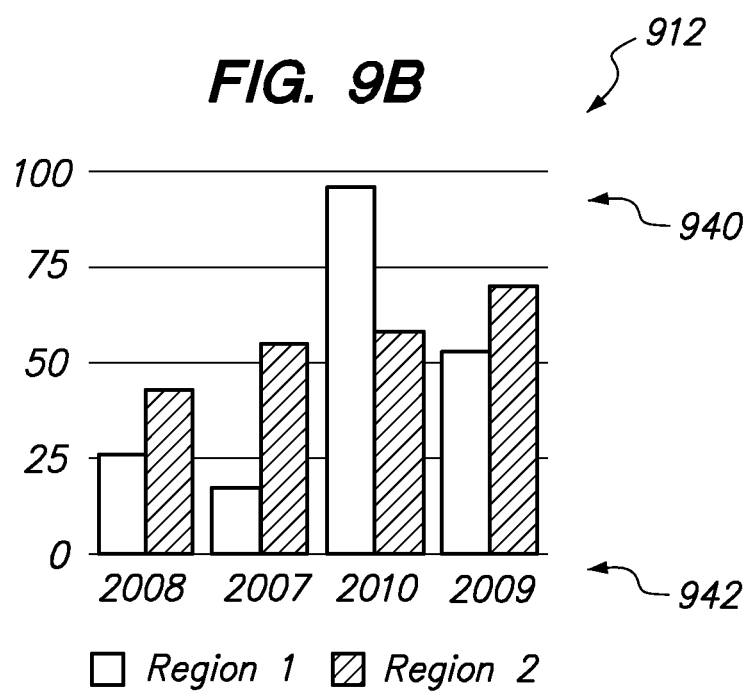

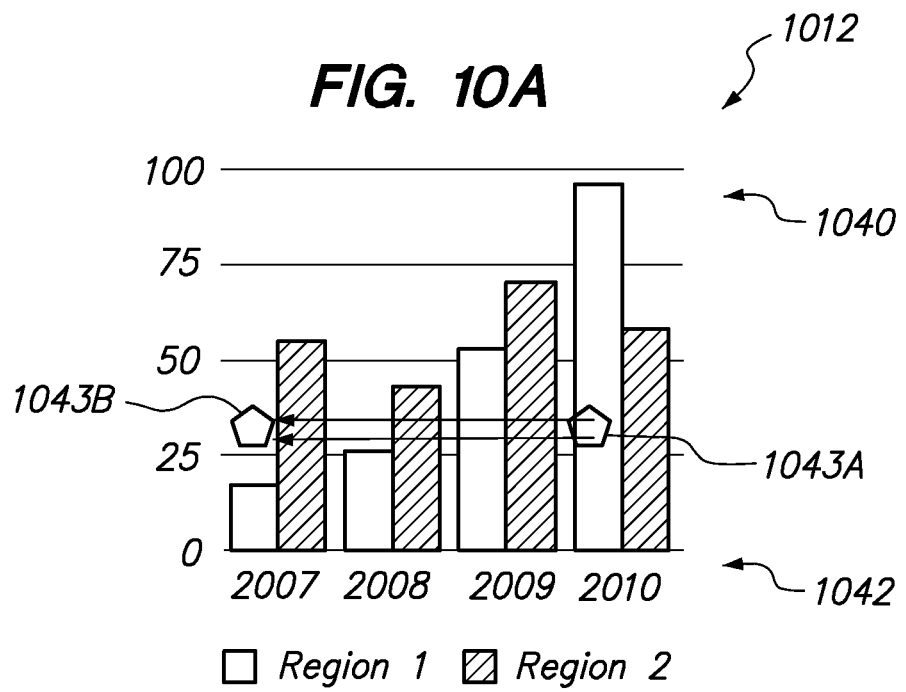
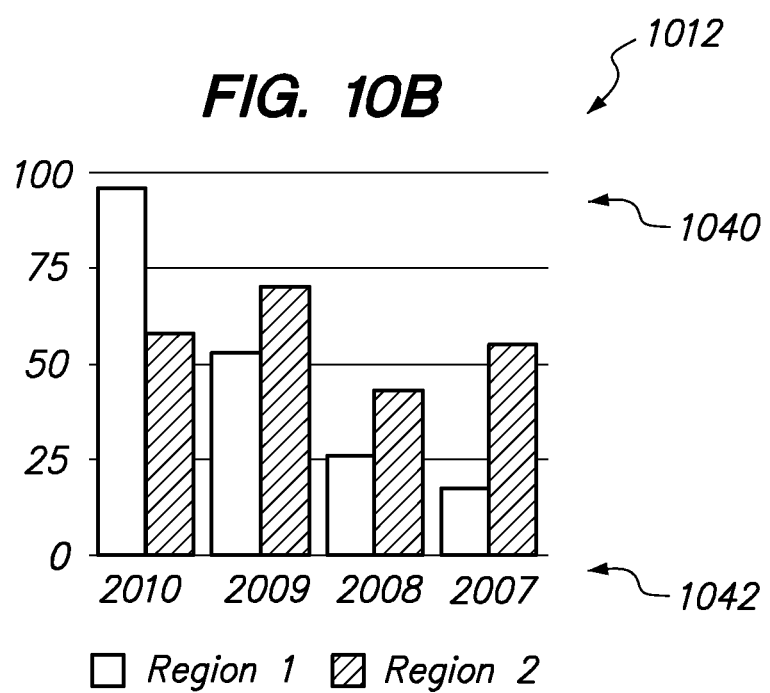

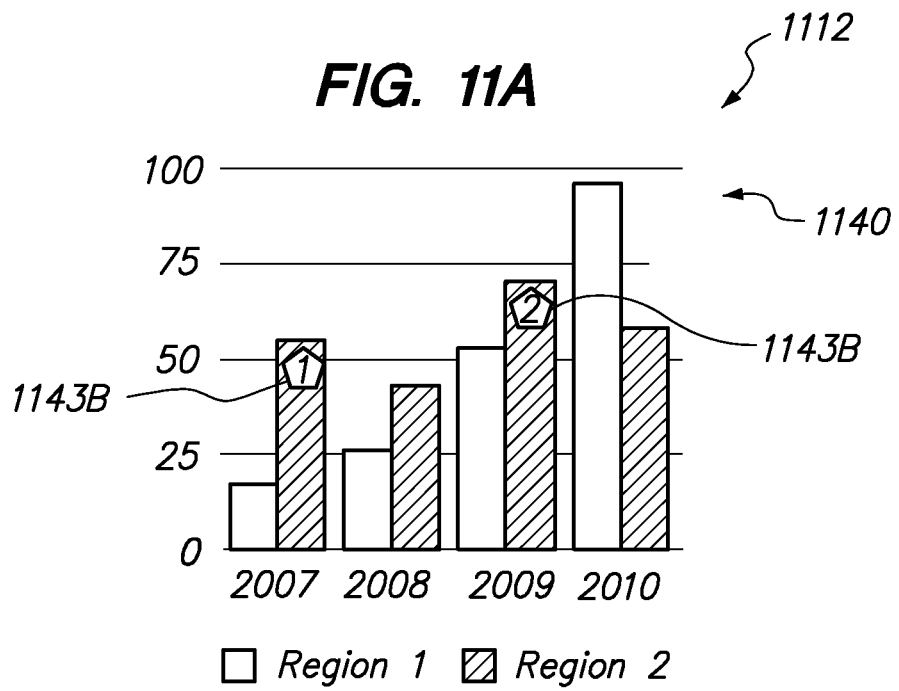
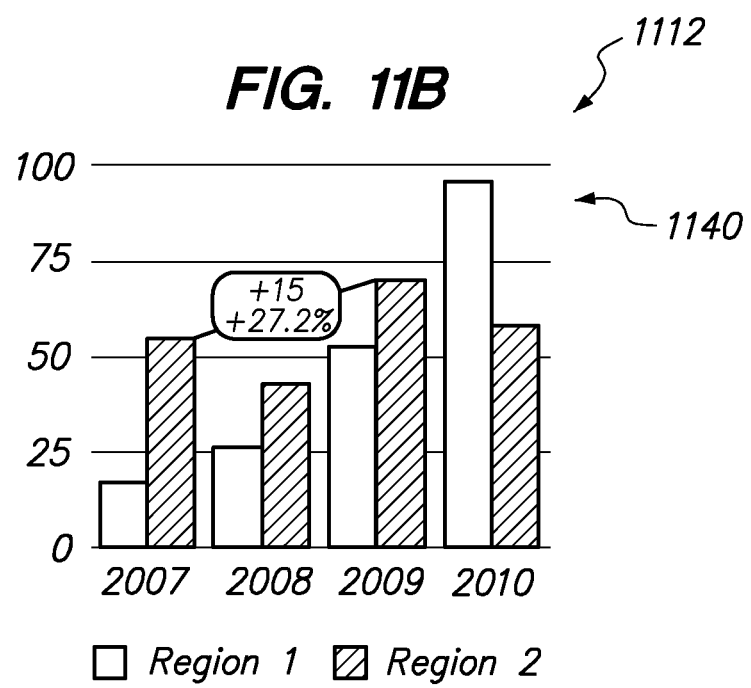

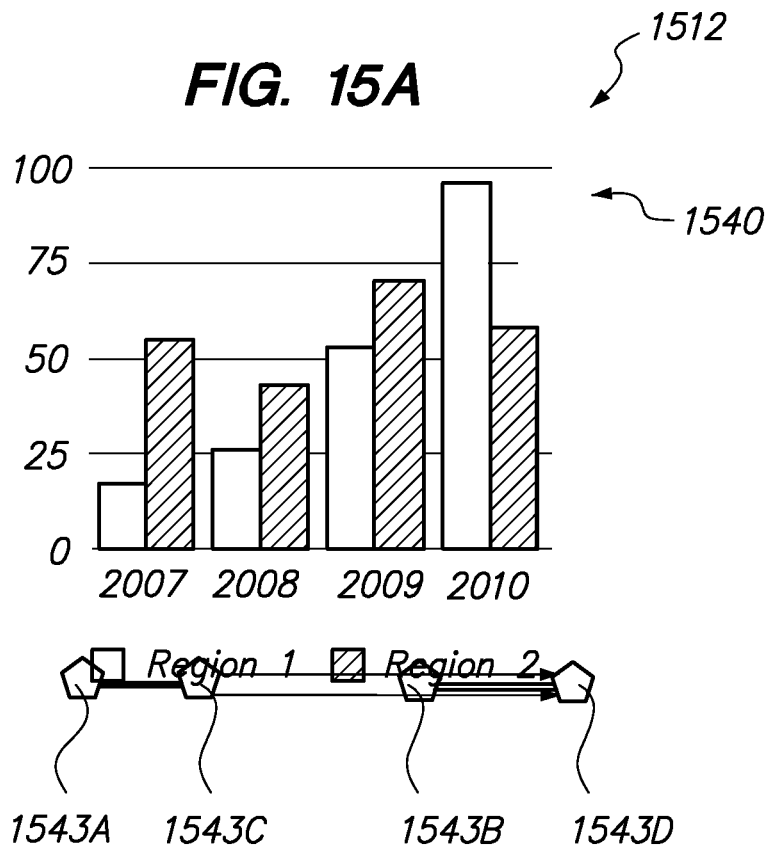
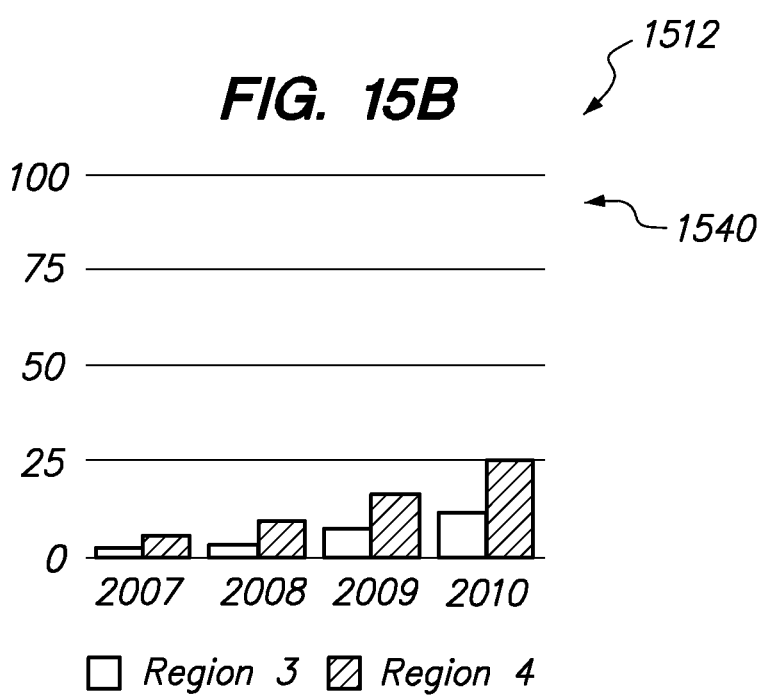

FIG. 19A
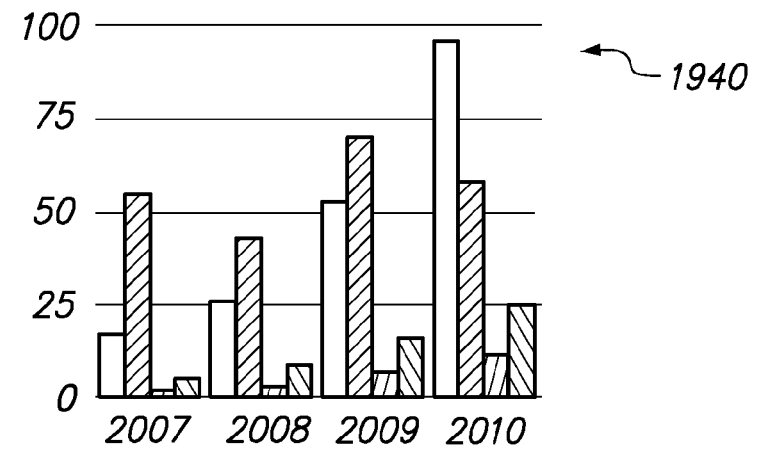
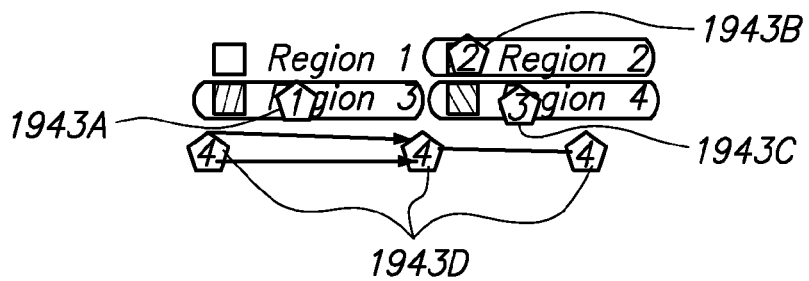
FIG. 19B
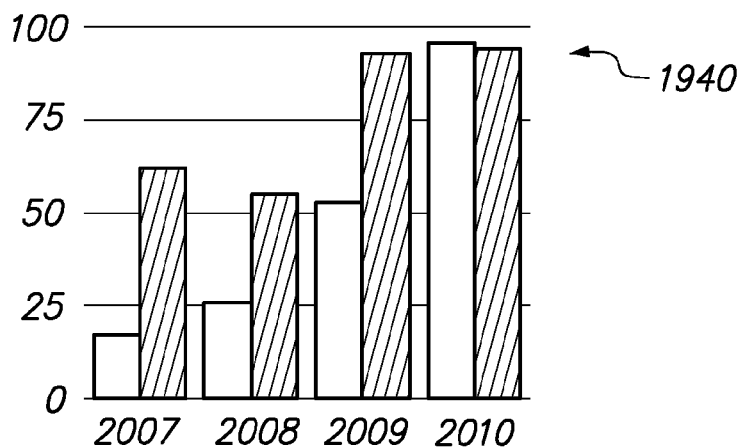

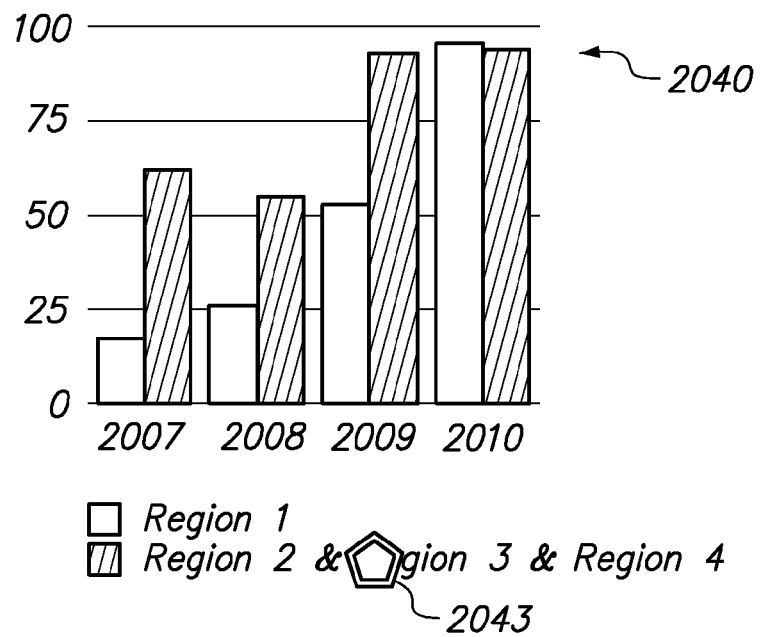
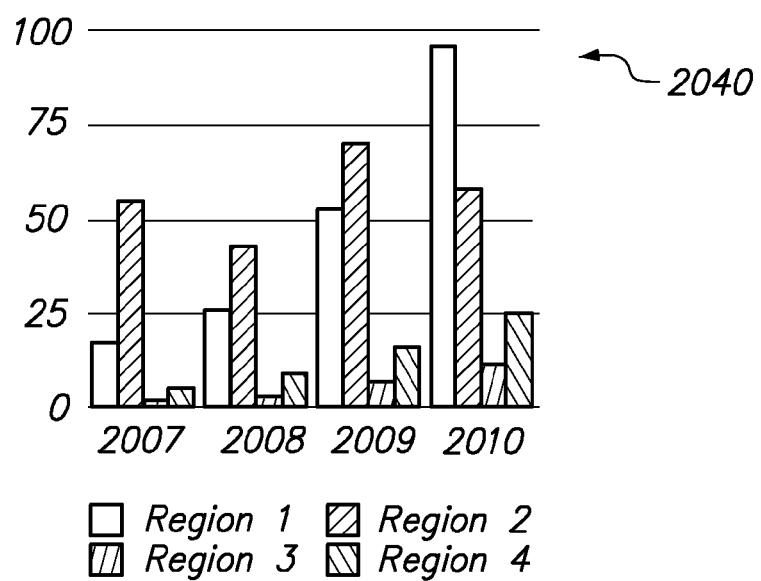

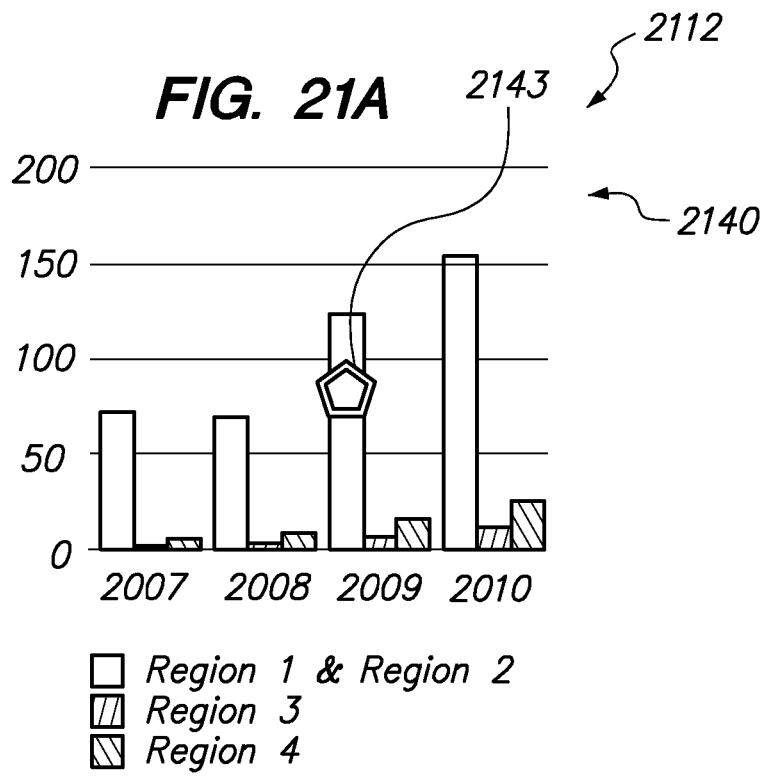
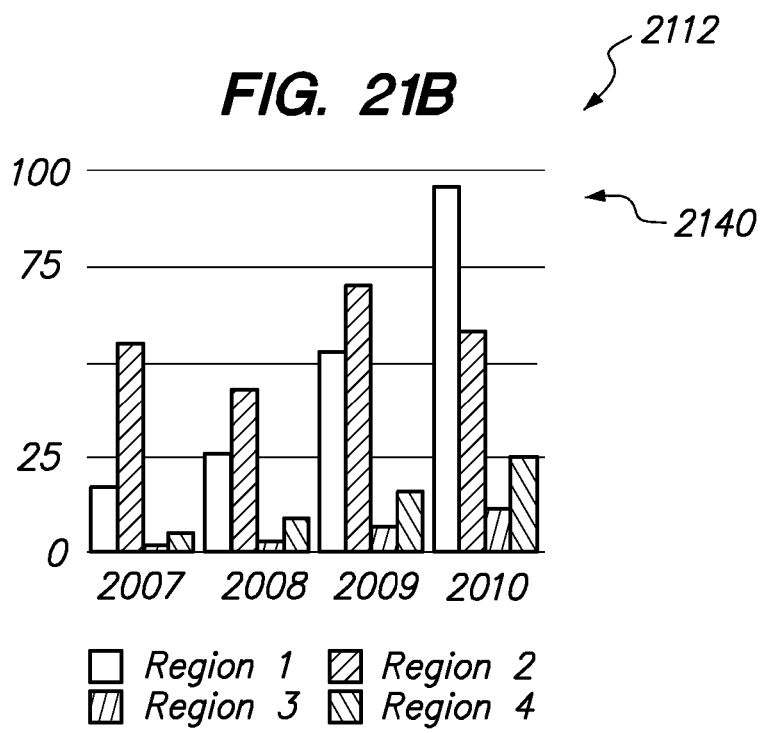

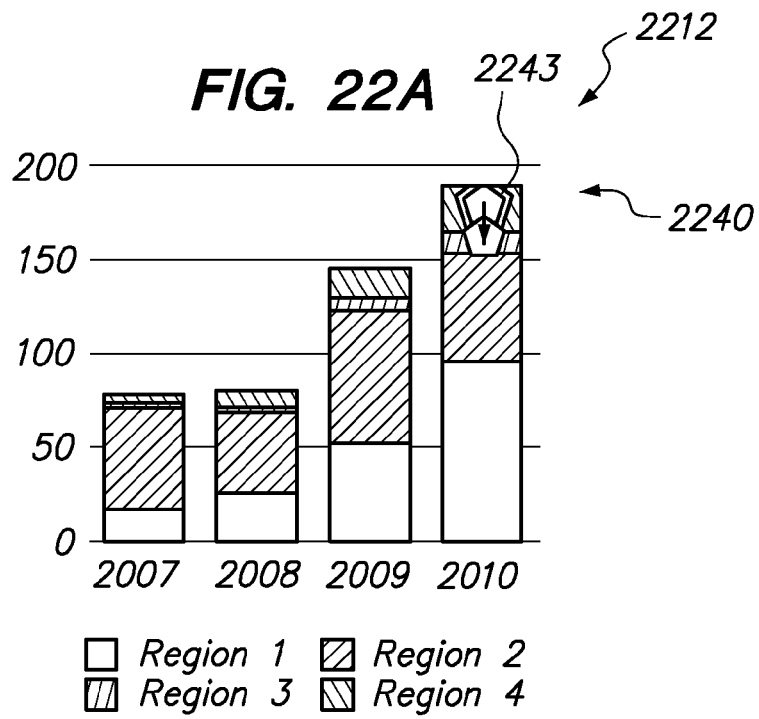
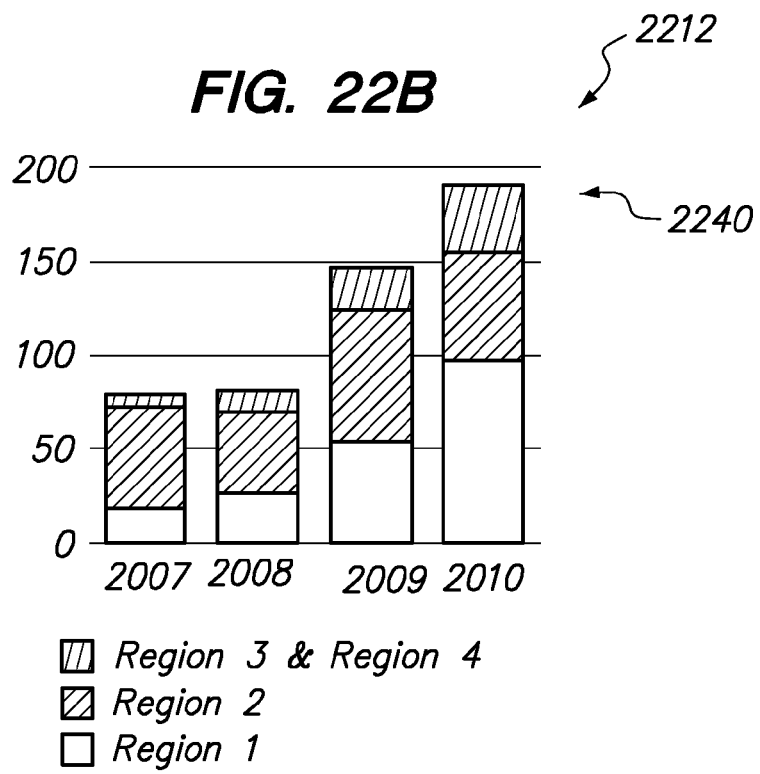

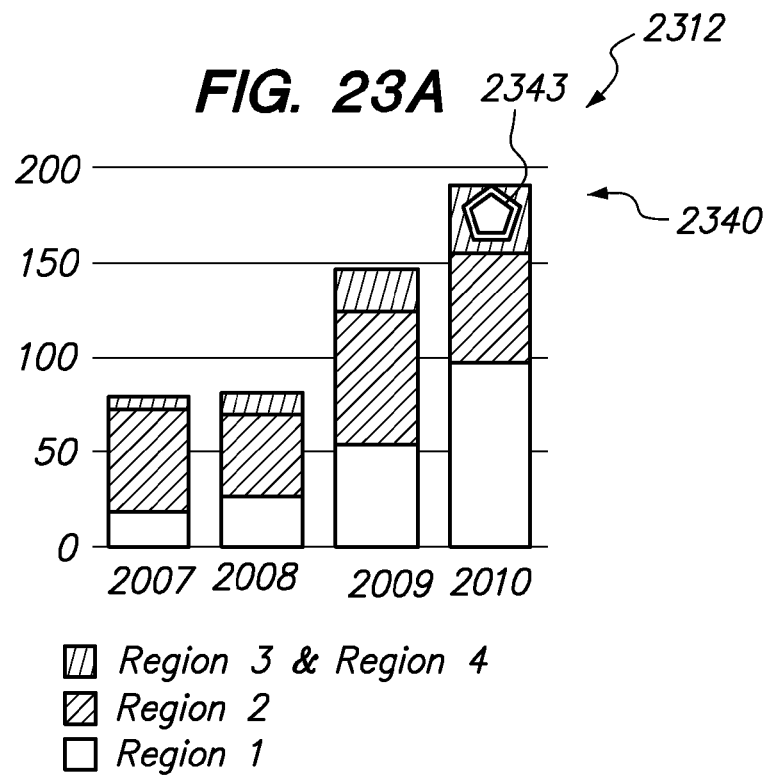
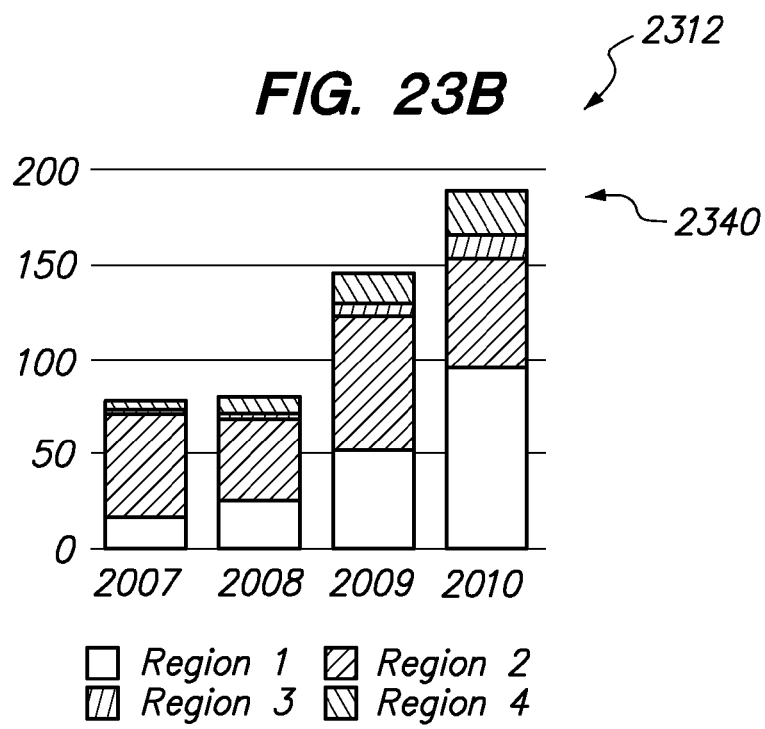

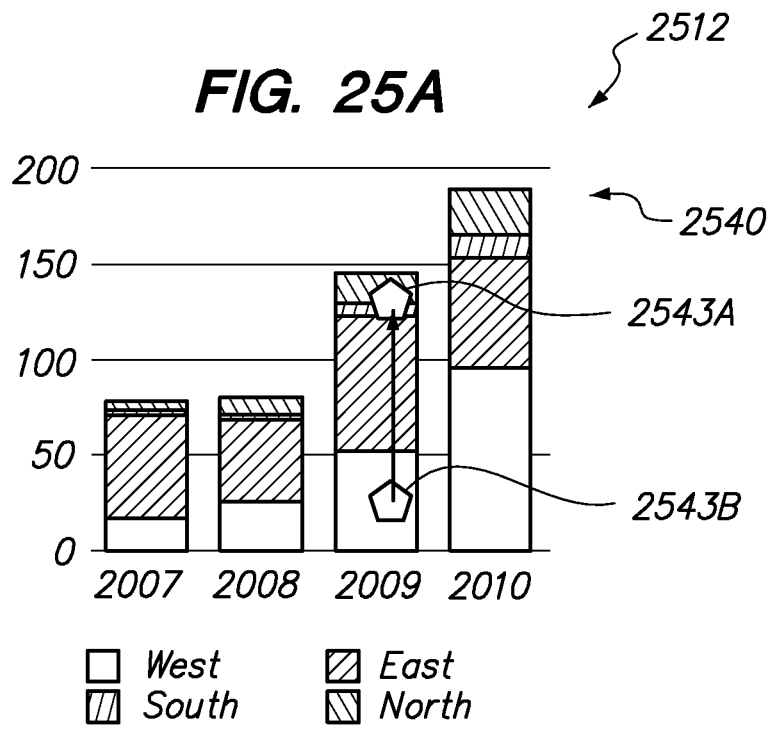
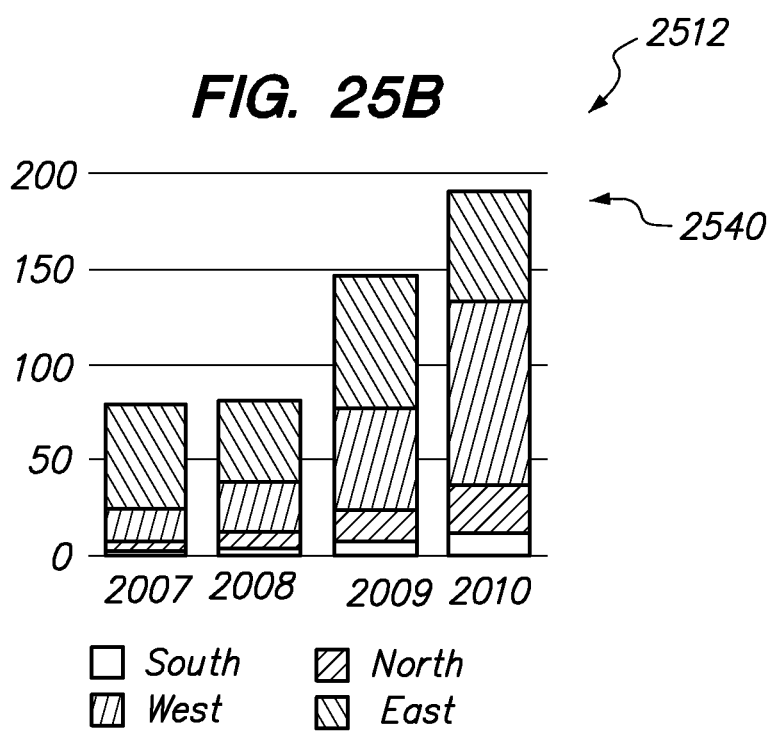

○ File/Print  ⊘ IT Infrastruct
⦿ Decision Support  ⊗ Transaction System
⊖ Collaborative  ⓪ Other ○ File Print  ⊘ IT Infrastruct
⦿ Decision Support  ⊗ Transaction System
⊖ Collaborative  ⓪ Web Tier
⊗ Mobile  ⊘ HPC
⊕ Desktop Virt ○ File Print
◐ Decision Support
⊖ Collaborative
⊗ Mobile
⊕ Desktop Virt
⊘ IT Infrastruct
⊗ Transaction System
⦿ Web Tier
⊘ HPC ○ File/Print
⊗ Decision Support & Transaction System
⦿ Web Tier
⊘ HPC
⊘ IT Infrastruct
⊖ Collaborative
⊗ Mobile
⦿ Desktop Virt O Decision Support   ⊘ File/Print
⊗ Collaborative      ⊘ Desktop Virt
⊖ Transaction Systems ⊕ IT Infrastruct
⊕ HPC                ⊗ Web Tier
⊕ Mobile O File Print         ⊘ IT Infrastruct
⊕ Decision Support   ⊗ Transaction System
⊖ Collaborative      ⊕ Web Tier
⊗ Mobile             ⊘ HPC
⊕ Desktop Virt

MANIPULATING DATA VISUALIZATIONS ON A TOUCH SCREEN

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present invention relates generally to computer user input systems, methods, and devices, and more particularly, to systems, methods, and devices for interpreting manual touch gestures as input to a touch screen for manipulating computer-generated data visualizations such as column charts, bar charts, and pie charts.

Various types of user input devices currently exist for performing various operations in a computing device. Such input devices include, as examples, keyboards, mice, trackballs, switches, touch screens, and other types of input devices. Some of the operations that can be accomplished with these user input devices include moving a cursor, selecting content displayed on a display screen, scrolling, panning, zooming, and other operations.

Increasingly, computer applications are receiving user input through a touch screen (also known as a "touchscreen" or a "touch-sensitive display"). This increase has been driven in part by the wide availability of relatively inexpensive portable personal computing devices such as tablet computers and mobile phones that incorporate touch screens into their form factors. Touch screens are employed in many different types of electronic devices to display graphics and text, and to provide a user interface through which a user may interact with the electronic devices. A touch screen includes a touch panel for detecting/sensing contact on the touch screen and a display for displaying graphics, text, and video. The touch panel can use any number of known technologies for detecting/sensing contact on the touch screen such as resistive, capacitive, optical, or other known technologies.

Touch screens are becoming more popular for use as displays and as user input devices on electronic devices. Unfortunately, users are currently unable to interact with and manipulate certain types of data in meaningful and natural ways using touch gestures as input to a touch screen. More particularly, users are currently unable to interact with and manipulate data visualizations in meaningful and natural ways using touch gestures.

Accordingly, there is a need for more efficient, user-friendly, and natural procedures for interacting with and manipulating data visualizations using touch gestures as input to a touch screen.

BRIEF DESCRIPTION OF DRAWINGS

In the drawings:

FIG. 1 is a block diagram illustrating a sample electronic device on which embodiments of the invention may be implemented.

FIGS. 6A-B illustrate a GUI displayed on a touch screen at various points during the performance of a touch gesture to pan across the horizontal axis of a column chart, according to an embodiment of the invention.

FIGS. 7A-C illustrate a GUI displayed on a touch screen at various points during the performance of a touch gesture to hide display of a horizontal axis category from a column chart, according to an embodiment of the invention.

FIGS. 8A-C illustrate a GUI displayed on a touch screen at various points during the performance of a touch gesture to move a horizontal axis category along the horizontal axis of a column chart, according to an embodiment of the invention.

FIGS. 9A-B illustrate a GUI displayed on a touch screen at various points during the performance of a touch gesture to sort horizontal axis categories of a column chart in ascending order, according to an embodiment of the invention.

FIGS. 10A-B illustrate a GUI displayed on a touch screen at various points during the performance of a touch gesture to sort horizontal axis categories of a column chart in descending order, according to an embodiment of the invention.

FIGS. 11A-B illustrate a GUI displayed on a touch screen at various points during the performance of a touch gesture to compare data points of a column chart, according to an embodiment of the invention.

FIGS. 15A-B illustrate a GUI displayed on a touch screen at various points during the performance of a touch gesture to pan across sub-categories of a column chart, according to an embodiment of the invention.

FIGS. 19A-B illustrate a GUI displayed on a touch screen at various points during the performance of a touch gesture to aggregate sub-categories of a column chart, according to an embodiment of the invention.

FIGS. 20A-B illustrate a GUI displayed on a touch screen at various points during the performance of a touch gesture to disaggregate sub-categories of a column chart, according to an embodiment of the invention.

FIGS. 21A-B illustrate a GUI displayed on a touch screen at various points during the performance of a touch gesture to disaggregate sub-categories of a column chart, according to an embodiment of the invention.

FIGS. 22A-B illustrate a GUI displayed on a touch screen at various points during the performance of a touch gesture to aggregate sub-categories of a stacked column chart, according to an embodiment of the invention.

FIGS. 23A-B illustrate a GUI displayed on a touch screen at various points during the performance of a touch gesture to disaggregate sub-categories of a stacked column chart, according to an embodiment of the invention.

FIGS. 25A-B illustrate a GUI displayed on a touch screen at various points during the performance of a touch gesture to sort sub-categories of a stacked column chart in descending order, according to an embodiment of the invention.

DETAILED DESCRIPTION OF EMBODIMENTS

Figure 2A:
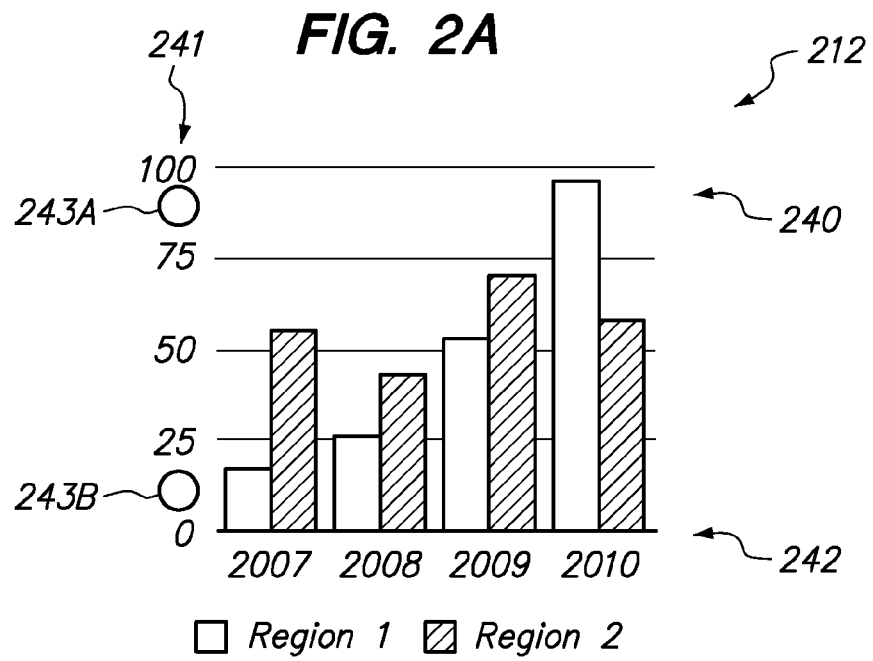
FIGS. 2A-B illustrate a graphical user interface (GUI) displayed on a touch screen at various points during the performance of a touch gesture to zoom out the vertical axis of a column chart, according to an embodiment of the invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments of the invention will be described according to the following outline:

1.0 OVERVIEW
2.0 SAMPLE ELECTRONIC DEVICE
3.0 TOUCH GESTURES FOR MANIPULATING DATA VISUALIZATIONS
4.0 MANIPULATIONS OF DATA VISUALIZATIONS USING TOUCH GESTURES
   4.1 MANIPULATION OF COLUMN CHARTS
      4.1.1 ZOOMING OUT THE VERTICAL AXIS
      4.1.2 ZOOMING IN THE VERTICAL AXIS
      4.1.3 ZOOMING OUT THE HORIZONTAL AXIS
      4.1.4 ZOOMING IN THE HORIZONTAL AXIS
      4.1.5 PANNING ACROSS THE HORIZONTAL AXIS
      4.1.6 HIDING DISPLAY OF A CATEGORY
      4.1.7 MOVING A CATEGORY ALONG THE HORIZONTAL AXIS
      4.1.8 SORTING HORIZONTAL AXIS CATEGORIES IN ASCENDING ORDER
      4.1.9 SORTING HORIZONTAL AXIS CATEGORIES IN DESCENDING ORDER
      4.1.10 COMPARING DATA POINTS
      4.1.11 SHOWING MORE SUB-CATEGORIES
      4.1.12 SHOWING FEWER SUB-CATEGORIES
      4.1.13 PANNING OVER SUB-CATEGORIES
      4.1.14 HIDING A SPECIFIC SUB-CATEGORY
      4.1.15 REVEALING A SUB-CATEGORY
      4.1.16 AGGREGATING SUB-CATEGORIES
      4.1.17 DISAGGREGATING SUB-CATEGORIES
      4.1.18 SORTING STACKED SUB-CATEGORIES IN ASCENDING ORDER
      4.1.19 SORTING STACKED SUB-CATEGORIES IN DESCENDING ORDER
   4.2 MANIPULATION OF BAR CHARTS
   4.3 MANIPULATION OF PIE CHARTS
      4.3.1 COLLAPSING CATEGORIES
      4.3.2 EXPANDING CATEGORIES
      4.3.3 COMBINING CATEGORIES
      4.3.4 SORTING CATEGORIES
5.0 EXAMPLE DEVICE CONFIGURATION
6.0 EXTENSIONS AND ALTERNATIVES 1.0 Overview Systems, methods, and devices for interpreting manual touch gestures as input to a touch screen for manipulating computer-generated data visualizations such as column charts, bar charts, and pie charts are provided. According to embodiments of the invention, graphical user interface (GUI) data visualization objects and elements (e.g., column charts, bar charts, pie charts, etc.) displayed on a touch screen may be manipulated by a user performing a variety of different conventional touch gestures directed to the touch screen. The conventional touch gestures are applied in new ways to the data visualization objects of the GUI to enable easy, rich, intuitive, and meaningful data visualization GUI element manipulation.

In some embodiments of the invention, the application of the touch gestures to the data visualization objects and elements of the GUI does not change the underlying visualized data. Instead, the touch gestures are applied for view manipulation only to provide the user different views of the visualized data.

According to some embodiments of the invention, a benefit of inventive approaches described herein for manipulating a data visualization through touch gestures is that, in response to a touch gesture to a touch screen of an electronic device displaying the data visualization, view manipulation of the data visualization can be accomplished without the need to carry out a request-response round trip over a data network from the electronic device displaying the data visualization to a server device on the data network and then back to the electronic device. In some embodiments of the invention, this round-trip-less view manipulation of the data visualization is accomplished locally at the electronic device, at least in part, by JavaScript instructions and web browser canvas drawing instructions (e.g., Hypertext Markup Language (HTML) 5

Canvas instructions, Scalable Vector Graphics (SVG) instructions, or Vector Modeling Language (VML) instructions) stored in a memory of the electronic device and executed by a processor of the electronic device.

2.0 Sample Electronic Device

For example, FIG. 1 is a block diagram that illustrates an electronic device, according to some embodiments of the invention. The device 100 includes a bus 102 or other communication mechanism for communicating information, and a hardware processor 104 coupled with bus 102 for processing information. Hardware processor 104 may be, for example, a general purpose microprocessor. The device 100 can be a portable electronic device, including but not limited to a handheld computer, a tablet computer, a mobile phone, a media player, a personal digital assistant (PDA), or the like. Alternatively, the device 100 can be a stationary electronic device, including but not limited to a desktop computer, a workstation computer, a gaming system, a smart appliance (e.g., television), or the like. It should be appreciated that the device 100 is only one example of an electronic computing device 100, and that the device 100 may have more or fewer components than shown, or a different configuration of components. For example, although illustrated outside the dashed-line box representing device 100 in FIG. 1, the touch screen 112 or other components illustrated outside the dashed line box in FIG. 1 may instead be a component of the device 100. The various components shown in FIG. 1 may be implemented in hardware, software, or a combination of hardware and software, including one or more signal processing and/or application specific integrated circuits.

Device 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render device 100 into a special-purpose machine that is customized to perform the operations specified in the instructions.

Device 100 may further include a read only memory (ROM) 108 or other static storage device coupled to bus 102 for storing static information and instructions for processor 104. A storage device 110, such as a magnetic disk, optical disk, or solid-state drive may be provided and coupled to bus 102 for storing information and instructions.

Device 100 is coupled via bus 102 to a touch screen 112. The touch screen 112 provides both an output interface and an input interface between the device 100 and a user. The touch screen 112 displays visual output such as text, graphics, and video to the user. Some or all of the visual output may correspond to user-interface objects, such as data visualization objects as described more fully below.

The touch screen 112 includes a touch-sensitive surface that accepts input from the user based on haptic and/or tactile contact to the touch-sensitive surface. The touch screen 112 and any associated modules/or sets of instructions stored in memory 106 and executed by the processor 104 detects contact (and any movement or break of the contact) on the touch screen 112 and converts the detected contact to into interaction with and manipulation of user-interface objects, such as data visualization objects, that are displayed on the touch screen 112. The contact with the touch screen 112 may be made by one or more fingers of the user's hand or hands. Alternatively, contact with the touch screen 112 may be made indirectly with the aid of a stylus, glove, or other device currently known or developed in the future. The touch screen 112 may use Liquid Crystal Display (LCD), Laser Phosphor Display (LPD), Light Emitting Diode (LED), or other technology currently known or developed in the future for the display portion of the touch screen 112.

Another input device 114, including alphanumeric and other keys, may be coupled to bus 102 for communicating information and command selections to processor 104. Another type of user input device may be cursor control 116, such as a mouse, a trackball, or cursor direction keys for communicating direction information and command selections to processor 104 and for controlling cursor movement on the touch screen 112. This input device typically has two degrees of freedom in two axes, a first axis (e.g., x) and a second axis (e.g., y), that allows the device to specify positions in a plane.

Device 100 may implement the techniques described herein using customized hard-wired logic, one or more ASICs or FPGAs, firmware and/or program logic which in combination with the device 100 causes or programs device 100 to be a special-purpose machine. According to one embodiment of the invention, the techniques herein are performed by device 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments of the invention, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Device 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from device 100, are example forms of transmission media.

Device 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

3.0 Touch Gestures for Manipulating Data Visualizations

For expository purposes, conventional touch gestures will now be described generally. Applications of these touch gestures to data visualizations are described in greater detail below.

A "tap" touch gesture is one where the user briefly touches the surface of the touch screen at a single point of contact. For example, the user may perform a tap gesture by briefly touching the touch screen surface with a fingertip.

A "double tap" touch gesture is one where the user rapidly touches the surface of the touch screen twice at the same or approximately same point of contact. For example, the user may perform a double tap gesture by rapidly touching the touch screen surface twice with a fingertip.

A "drag" or "swipe" touch gesture is one where the user moves a touch over the surface of the touch screen from a first point of contact to a second point of contact without losing contact with the touch screen during the movement and then releases contact with the touch screen at the second point of contact. For example, the user may perform a drag or swipe gesture by moving a fingertip over the touch screen surface without losing contact.

A "pinch" touch gesture is one where the user simultaneously touches the surface of the touch screen at two points of contact bringing the elements in contact with the touch screen surface closer together while maintaining contact with the touch screen surface. For example, the user may perform a pinch gesture by touching the touch screen surface with two fingers and then bringing the fingers closer together.

A "spread" touch gesture is one where the user simultaneously touches the surface of the touch screen at two points of contact moving the elements in contact with the touch screen surface farther apart while maintaining contact with the touch screen surface. For example, the user may perform a spread gesture by touching the touch screen surface with two fingers and then moving the fingers away from each other.

A "press" touch gesture is one where the user touches the surface of the touch screen at a single point of contact for an extended period of time (e.g., more than one second). For example, the user may perform a press gesture by touching the touch screen surface with a single finger for an extended period of time such as more than one second.

A "press and drag" gesture is one where the user touches the surface of the touch screen at an initial point of contact for an extended period of time (e.g., more than one second) and then moves the touch over the surface of the touch screen from the initial point of contact to a second point of contact without losing contact with the touch screen during the press and drag.

A "flick" touch gesture is one where the user quickly brushes the surface of the touch screen. For example, the user may perform a flick gesture by quickly brushing the touch screen surface with a single finger.

A "rotate" touch gesture is one where the user simultaneously touches the surface of the touch screen at two points of contact and then moves one point of contact in a circular motion around the other point of contact while maintaining contact with the touch screen. For example, the user may perform a rotate gesture by placing a thumb and finger on the touch screen and moving the finger in a circular motion around the thumb.

A "multi-touch and drag" gesture is one where the user simultaneously touches the surface of the touch screen at two points of contact and then moves the two points of contact over the surface the surface of the touch screen from the initial points of contact to two new points of contact without losing contact with the touch screen during the multi-touch and drag gesture.

4.0 Manipulations of Data Visualizations Using Touch Gestures

Various manipulations of computer-generated data visualizations using touch gestures will now be described with reference to the example GUIs of FIGS. 2-29. It should be understood that the GUIs shown are merely exemplary and the invention is not limited to manipulation of only the example GUIs shown. It will be appreciated that the manipulations may be applied to GUIs other than or different from the ones shown.

For expository purposes, the term "horizontal" as used herein is defined as a plane parallel to the plane of the user's eyes, regardless of the user's orientation. The term "vertical" refers to a direction perpendicular to the horizontal just defined.

4.1 Manipulation of Column Charts 4.1.1 Zooming Out the Vertical Axis

Figure 2B:
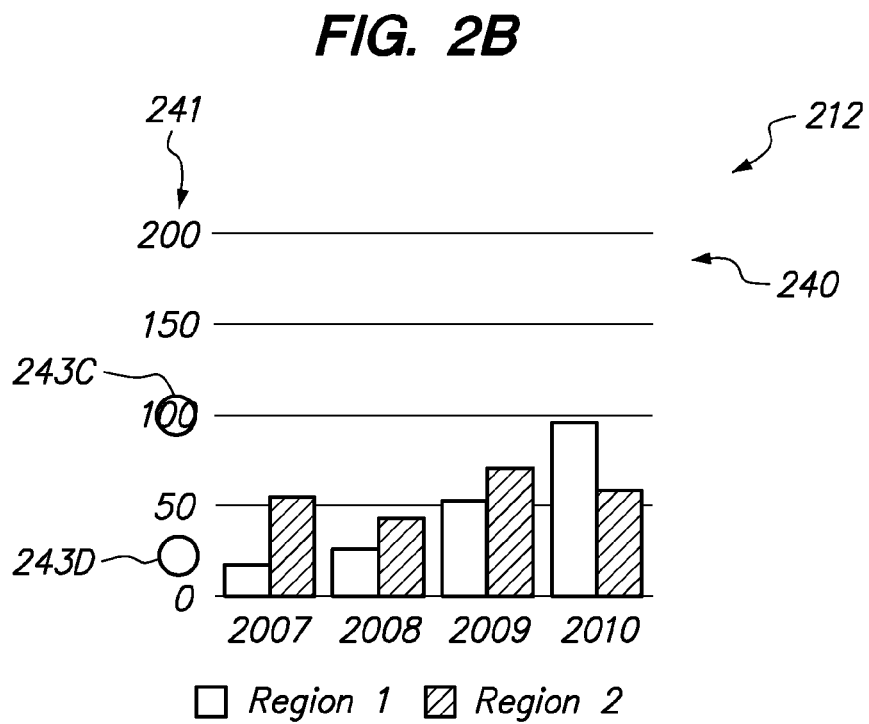

According to one embodiment of the invention, a user may perform a pinch gesture to zoom out the vertical axis of a column chart. FIGS. 2A-B illustrate a GUI 240 displayed on a touch screen 212 at various points during the performance of a pinch gesture 243 to zoom out the vertical axis 241 of a column chart, according to an embodiment of the invention. The user may zoom out the vertical axis of the chart to increase the range of values represented by the vertical axis and reduce the display size of the columns of the chart.

In FIG. 2A, the GUI 240 displayed on the touch screen 212 includes a column chart displayed in a first display state for comparing values across year-based categories. The first display state corresponds when the touch contact points 243A and 243B of the pinch gesture 243 are relatively far apart.

Note that the touch contact points 243A and 243B illustrated in FIG. 2A and the touch contact points illustrated in the remaining figures are illustrated for explanatory purposes only and may not actually be displayed on the touch screen. However, it should be understood that the present invention does not prohibit the display of touch contact points or other touch gesture indicators on the touch screen.

The chart of FIG. 2A has a vertical axis 241 and a horizontal axis 242. The vertical axis 241 includes a current minimum value and a current maximum value. A vertical axis may also include a current minimum displayed value which may or may not correspond to the current minimum value of the vertical axis. A vertical axis may also include a current maximum displayed value which may or may not correspond to the current maximum value of the vertical axis. In the example of FIG. 2A, in the first display state, the current minimum value and the current minimum displayed value is 0 and the current maximum value and the current maximum displayed value is 100.

A column chart may also include a number of horizontal gridlines. In the example of FIG. 2A, in the first display state, the number of horizontal gridlines is five including the horizontal gridline corresponding to the horizontal axis 242.

Note that while the GUI 240 shown in FIG. 2A is not illustrated to occupy the entire touch screen 212 display area, in other embodiments, the GUI 240 and/or other GUIs illustrated in the figures occupies all or substantially all of the touch screen display area.

In FIG. 2B, the GUI 240 has transitioned to a second display state in response to the pinch gesture 243 to zoom out the vertical axis 241. The second display state corresponds when the contact points 243C and 243D of the pinch gesture 243 are relatively close together. In the second display state, the current maximum value and the current maximum displayed value of the vertical axis 241 has increased from 100 to 200 and the columns are drawn smaller (i.e., at least shorter in height) in accordance with the user's request to zoom out the vertical axis 241. It will be appreciated that the underlying chart values are not changed by the request. For example, the chart value for "Region 2" in year 2010 is the same in both of the charts of FIG. 2A and FIG. 2B.

In some embodiments of the invention, the transition between the first display state and the second display state is animated such that the user can view the columns becoming smaller and the current maximum displayed value of the vertical axis increasing as the user performs the pinch gesture to zoom out the vertical axis.

In some embodiments of the invention, the vertical axis is zoomed out in response to a pinch gesture only if the pinch gesture initially has a vertical orientation as opposed to a horizontal orientation. In one embodiment, the initial orientation of a pinch gesture is determined based on an angular measurement of a circle defined by the two initial contact points of the pinch gesture in which one of the two contact points is considered the center of the circle and a straight line distance between the two contact points is considered the radius of the circle. However, other techniques may be used to determine whether a pinch gesture has a vertical orientation and the invention is not limited to any particular technique. In one embodiment, a pinch gesture that initially has a vertical orientation is treated as a vertical pinch gesture even if the pinch gesture changes orientation during its performance by a user from its initial vertical orientation to a horizontal orientation.

While in the embodiment of FIGS. 2A-2B, the contact points 234A, 234B, 243C, and 243D of the pinch gesture are directed to the vertical axis 241, in other embodiments, the contact points of the pinch gesture 243 are directed to other areas of the GUI 240.

In some embodiments, zooming out the vertical axis with a pinch gesture causes the number of gridlines of the column chart to increase between the first display state and the second display state. In other embodiments, the number of gridlines stays the same. For example, in the example of FIGS. 2A-B, the number of gridlines remained at five between the first display state and the second display state.

In some embodiments, zooming out the vertical axis causes the difference between adjacent values displayed in the vertical axis to increase between the first display state and the second display state. For example, in the example of FIGS. 2A-B, the difference between the adjacent values displayed in the vertical axis 241 increased from 25 to 50. In other embodiments, the difference between adjacent values displayed in the vertical axis stays the same between the first display state and the second display state.

In some embodiments, a pinch gesture to zoom out the vertical axis can be used to reduce the size of columns so that partially viewable columns are wholly viewable. An arrow or other indicator may be displayed on the touch screen or GUI when at least one column is only partially viewable because of the current vertical axis zoom level. As the pinch gesture is performed and a formerly only partially viewable column becomes wholly viewable, the arrow or indicator may disappear.

4.1.2 Zooming in the Vertical Axis

Figure 3A:
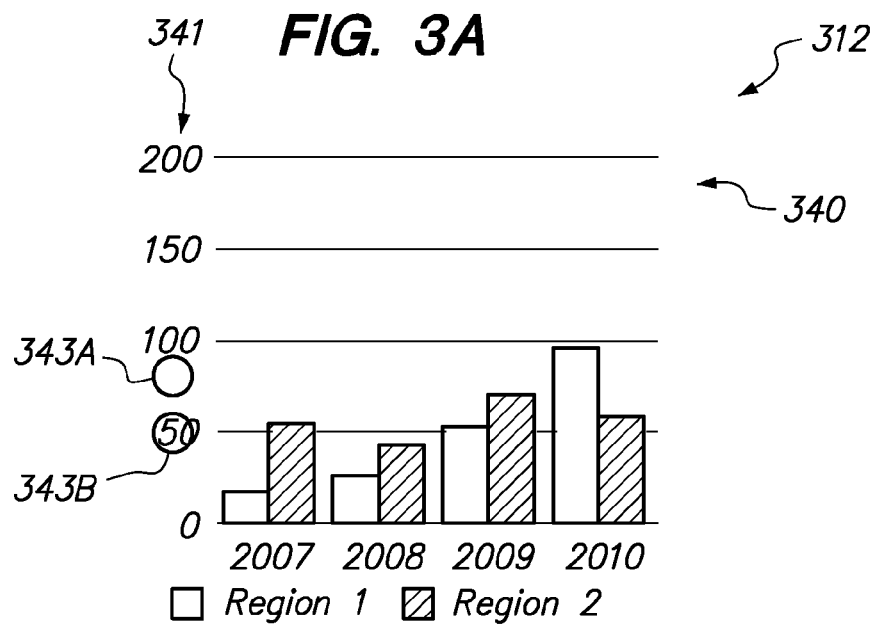
FIGS. 3A-B illustrate a GUI displayed on a touch screen at various points during the performance of a touch gesture to zoom in the vertical axis of a column chart, according to an embodiment of the invention.
Figure 3B:
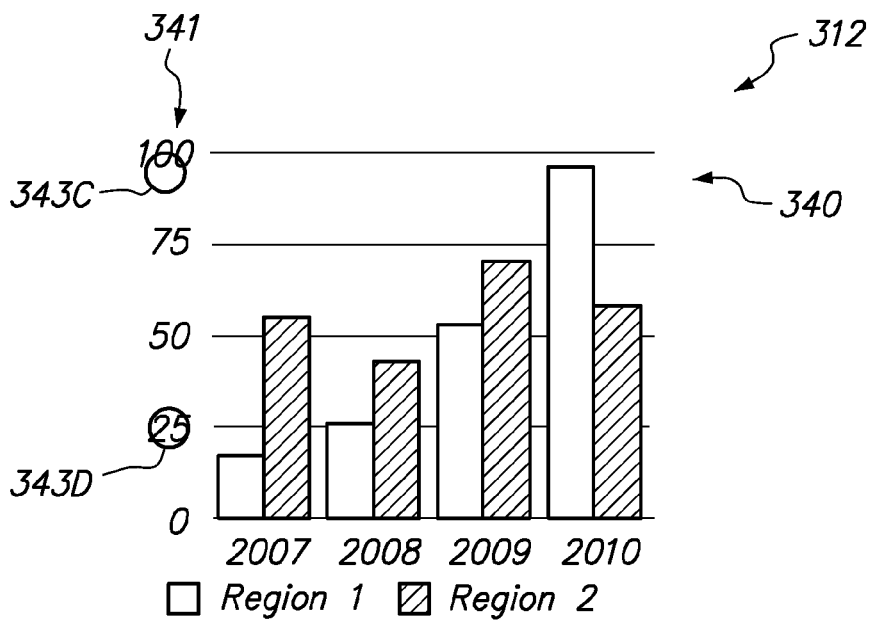

According to one embodiment of the invention, a user may perform a spread gesture to zoom in the vertical axis of a column chart. FIGS. 3A-B illustrate a GUI 340 displayed on a touch screen 312 at various points during the performance of a spread gesture 343 to zoom in the vertical axis 341 of a column chart, according to an embodiment of the invention. The user may zoom in the vertical axis of the chart to decrease the range of values represented by the vertical axis and to enlarge the display size of the columns of the chart.

In FIG. 3A, the GUI 340 displayed on the touch screen 312 includes a column chart displayed in a first display state for comparing values across year-based categories. The first display state corresponds when the contact points 343A and 343B of the spread gesture 343 are relatively close together. In this example, in the first display state, the current minimum value and current minimum displayed value of the vertical axis 341 is 0 and the current maximum value and the current maximum displayed value is 200.

In FIG. 3B, the GUI 340 has transitioned to a second display state in response to the spread gesture 343 to zoom in the vertical axis 341. The second display state corresponds when the contact points 343C and 343D of the spread gesture 343 are relatively far apart. In the second display state, the current maximum value and the current maximum displayed value of the vertical axis 341 has decreased from 200 to 100 and the columns are drawn larger (i.e., at least higher in height) in accordance with the zoomed in vertical axis 341. It will be appreciated that the underlying chart values are not changed by the spread gesture. For example, the chart value for "Region 2" in the year 2010 is the same in both of the charts of FIG. 3A and FIG. 3B.

In some embodiments of the invention, the transition between the first display state and the second display state is animated such that the user can view the columns becoming larger and the maximum displayed value of the vertical axis decreasing as the user performs the spread gesture.

In some embodiments of the invention, the vertical axis is zoomed in in response to a spread gesture only if the spread gesture initially has a vertical orientation as opposed to a horizontal orientation.

While in the embodiment of FIGS. 3A-3B, the contact points 334A, 334B, 343C, and 343D of the spread gesture 343 are directed to the vertical axis 341, in other embodiments the contact points of the spread gesture are directed to other areas of the GUI 340.

In some embodiments, zooming in the vertical axis with a spread gesture causes the number of gridlines of the column chart to decrease between the first display state and the second display state. In other embodiments, the number of gridlines stays the same. For example, in the example of FIGS. 3A-B, the number of gridlines remained at five between the first display state and the second display state.

In some embodiments, zooming in the vertical axis causes the difference between adjacent values displayed in the vertical axis to decrease between the first display state and the second display state. For example, in the example of FIGS. 3A-B, the difference between adjacent values displayed in the vertical axis 341 decreased from 50 to 25. In other embodiments, the difference between adjacent values displayed in the vertical axis stays the same between the first display state and the second display state.

In some embodiments, a spread gesture to zoom in the vertical axis can be used to enlarge columns so that wholly viewable columns are only partially viewable. An arrow or other indicator may be displayed on the touch screen or GUI when a column is only partially viewable because of the current vertical axis zoom level. As the spread gesture is performed and a formerly wholly viewable column becomes only partially viewable, the arrow or indicator may appear.

4.1.3 Zooming Out the Horizontal Axis

Figure 4A:
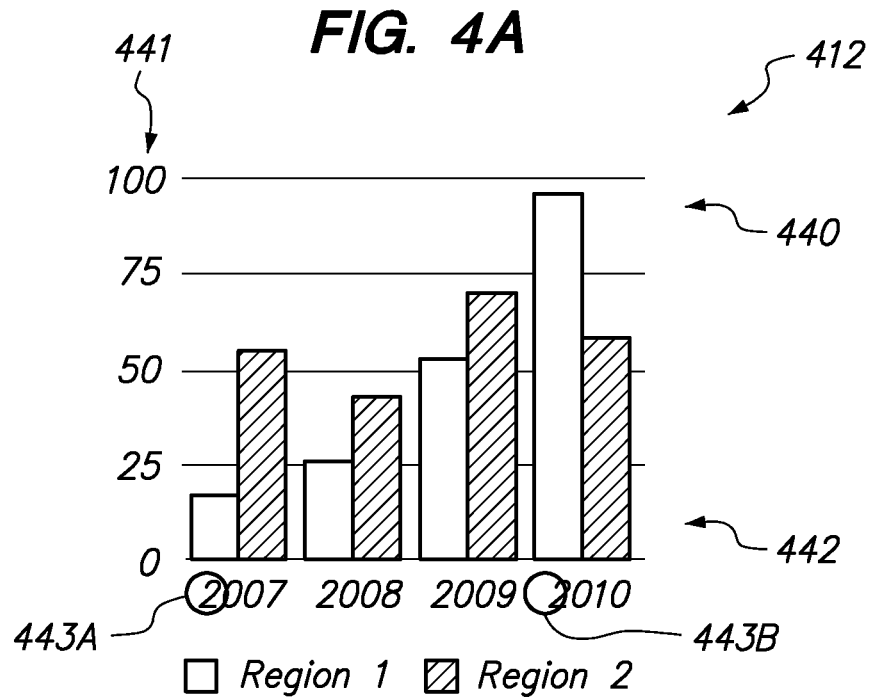
FIGS. 4A-B illustrate a GUI displayed on a touch screen at various points during the performance of a touch gesture to zoom out the horizontal axis of a column chart, according to an embodiment of the invention.
Figure 4B:
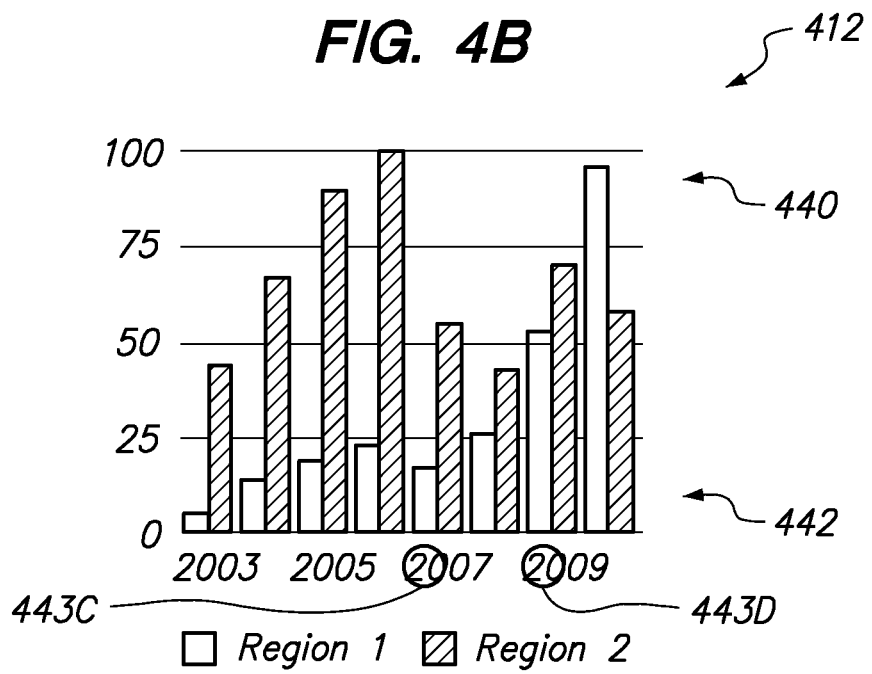

According an embodiment of the invention, a user may perform a pinch gesture to zoom out the horizontal axis of a column chart. FIGS. 4A-B illustrate a GUI 440 displayed on a touch screen 412 at various points during the performance of a pinch gesture 443 to zoom out the horizontal axis 442 of a column chart, according to an embodiment of the invention. The user may zoom out the horizontal axis of the chart to increase the number of categories represented by the horizontal axis and to reduce the display size of the columns of the chart.

In FIG. 4A, the GUI 440 displayed on the touch screen 412 includes a column chart displayed in a first display state for comparing values across year-based categories. The first display state corresponds when the contact points 443A and 443B of the pinch gesture 443 are relatively far apart. The chart has a vertical axis 441 and a horizontal axis 442. In this example, in the first display state, the number of categories represented by the horizontal axis 442 is four corresponding to the years 2007, 2008, 2009, and 2010.

In FIG. 4B, the GUI 440 has transitioned to a second display state in response to a pinch gesture 443 to zoom out the horizontal axis 442. The second display state corresponds when the contact points 443C and 443D of the pinch gesture 443 are relatively close together. In the second display state, the number of categories represented by the horizontal axis 442 has increased from four to eight and the columns are drawn smaller (i.e., at least narrower in width) in accordance with the zoomed out horizontal axis 442. It will be appreciated that the underlying chart values are not changed by the pinch gesture 443. For example, the chart value of "Region 2" in the year 2010 is the same in both of the charts of FIG. 4A and FIG. 4B.

In some embodiments of the invention, the transition between the first display state and the second display state is animated such that the user can view additional chart categories being revealed and the columns becoming smaller as the user performs the pinch gesture to zoom out the horizontal axis.

In some embodiments of the invention, the horizontal axis is zoomed out in response to a pinch gesture only while the pinch gesture has a horizontal orientation as opposed to a vertical orientation. The orientation of a pinch gesture may be determined based on an angular measurement of a circle defined by the two contact points of the pinch gesture in which one of the two contact points is considered the center of the circle and a straight line distance between the two contact points is considered the radius of the circle.

While in the embodiment of FIGS. 4A-4B, the contact points 434A, 434B, 443C, and 443D of the pinch gesture 443 are directed to the horizontal axis 441, in other embodiments the contact points of the pinch gesture 443 are directed to other areas of the GUI 440.

In some embodiments, zooming out the horizontal axis causes the difference between adjacent values displayed in the horizontal axis to increase between the first display state and the second display state. For example, in the example of FIGS. 4A-B, the difference between adjacent values displayed in the horizontal axis 442 increased from 1 to 2. In other embodiments, the difference between adjacent values displayed in the horizontal axis stays the same between the first display state and the second display state.

In some embodiments, a pinch gesture to zoom out the horizontal axis can be used to reveal additional chart values. For example, in FIG. 4B, the chart values for years 2003, 2004, 2005, and 2006 were made viewable within the GUI 440 viewing area by the pinch gesture 443 to zoom out the horizontal axis 442. An arrow or other indicator may be displayed on the touch screen or GUI when at least one chart value is not currently viewable because of the current horizontal axis zoom level. As the pinch gesture is performed and the formerly unviewable chart data becomes viewable, the arrow or indicator may disappear.

4.1.4 Zooming in the Horizontal Axis

Figure 5A:
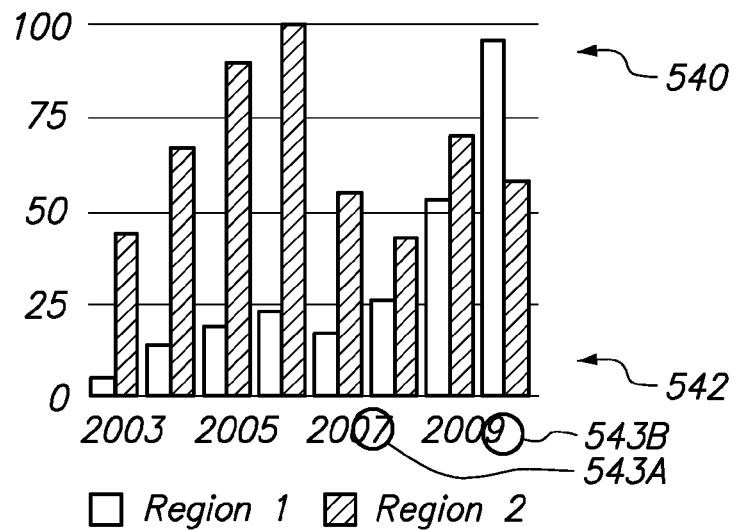
FIGS. 5A-B illustrate a GUI displayed on a touch screen at various points during the performance of a touch gesture to zoom in the horizontal axis of a column chart, according to an embodiment of the invention.
Figure 5B:
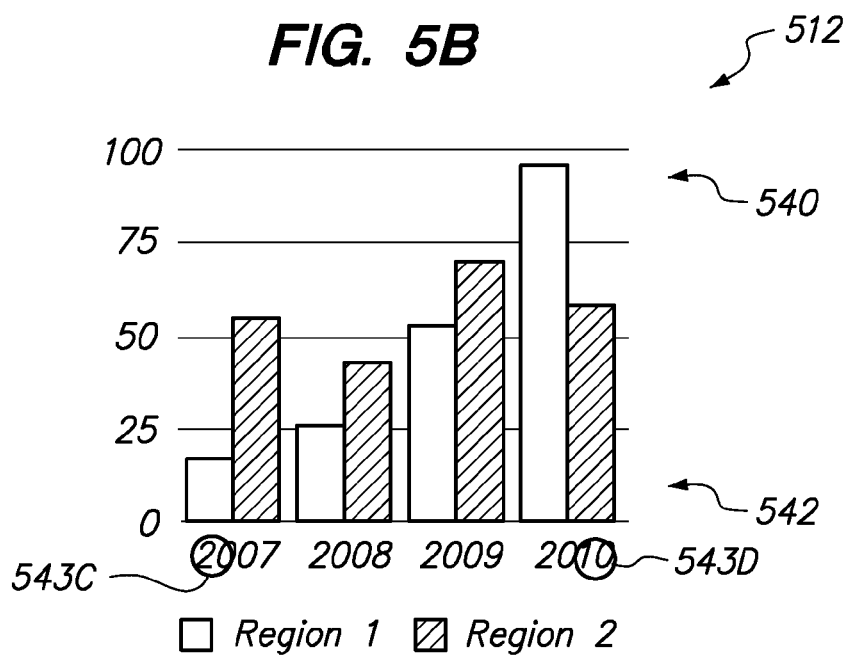

According to an embodiment of the invention, a user may perform a spread gesture to zoom in the horizontal axis of a column chart. FIGS. 5A-B illustrate a GUI 540 displayed on a touch screen 512 at various points during the performance of a spread gesture 543 to zoom in the horizontal axis 542 of a column chart, according to an embodiment of the invention. The user may zoom in the horizontal axis of the chart to decrease the number of categories represented by the horizontal axis and to enlarge the display size of the columns of the chart.

In FIG. 5A, the GUI 540 displayed on the touch screen 512 includes a column chart displayed in a first display state for comparing values across year-based categories. The first display state corresponds when the contact points 543A and 543B of the pinch gesture 543 are relatively close together. The chart has a vertical axis 541 and a horizontal axis 542. In this example, in the first display state, the number of categories represented by the horizontal axis 542 is eight corresponding to the years 2003 through 2010.

In FIG. 5B, the GUI 440 has transitioned to a second display state in response to a spread gesture 543 to zoom in the horizontal axis 542. The second display state corresponds when the contact points 543C and 543D of the spread gesture 543 are relatively far apart. In the second display state, the number of categories represented by the horizontal axis 442 has decreased from eight to four and the columns are drawn larger (i.e., at least wider in width) in accordance with the zoomed in horizontal axis 542. It will be appreciated that the underlying chart values are not changed by the spread gesture. For example, the chart value of "Region 2" in the year 2010 is the same in both of the charts of FIG. 5A and FIG. 5B.

In some embodiments of the invention, the transition between the first display state and the second display state is animated such that the user can view chart categories becoming unviewable and the columns becoming larger as the user performs the spread gesture to zoom in the horizontal axis.

In some embodiments of the invention, the horizontal axis is zoomed in in response to a spread gesture only while the spread gesture has a horizontal orientation as opposed to a vertical orientation. The orientation of a spread gesture may be determined based on an angular measurement of a circle defined by the two contact points of the pinch gesture in which one of the two contact points is considered the center of the circle and a straight line distance between the two contact points is considered the radius of the circle.

While in the embodiment of FIGS. 5A-5B, the contact points 534A, 534B, 543C, and 543D of the spread gesture 543 are directed to the horizontal axis 541, in other embodiments the contact points of the spread gesture 543 are directed to other areas of the GUI 540.

In some embodiments, zooming in the horizontal axis causes the difference between adjacent values displayed in the horizontal axis to decrease between the first display state and the second display state. For example, in the example of FIGS. 5A-B, the difference between adjacent values displayed in the horizontal axis 542 decreased from 2 to 1. In other embodiments, the difference between adjacent values displayed in the horizontal axis stays the same between the first display state and the second display state.

In some embodiments, a spread gesture to zoom in the horizontal axis can be used make currently viewable chart values unviewable. For example, in FIG. 5B, the chart values for years 2003, 2004, 2005, and 2006 were made unviewable within the GUI 540 viewing area by the spread gesture 543 to zoom in the horizontal axis. An arrow or other indicator may be displayed on the touch screen or GUI when at least one chart value is not currently viewable because of the current horizontal axis zoom level. As the spread gesture is performed and the formerly viewable chart data becomes unviewable, the arrow or indicator may appear.

4.1.5 Panning Across the Horizontal Axis

According to an embodiment of the invention, a user may perform a drag, swipe, or flick gesture to pan across the horizontal axis of a column chart. FIGS. 6A-B illustrate a GUI 640 displayed on a touch screen 612 at various points during the performance of a drag, swipe, or flick gesture 643 to pan across the horizontal axis 642 of a column chart, according to an embodiment of the invention. The user may pan across the horizontal axis of the chart to shift the chart categories and chart values that are viewable along the horizontal axis either right or left depending on the general direction of the drag, swipe, or flick gesture. In one embodiment, the user may pan across the horizontal axis regardless of the current vertical axis zoom level or the current horizontal axis zoom level.

In FIG. 6A, the GUI 640 displayed on the touch screen 612 includes a column chart displayed in a first display state for comparing values across year-based categories. The first display state corresponds to the starting contact point 643A of the swipe, drag, or flick gesture 643. The chart has a vertical axis 641 and a horizontal axis 642. In this example, in the first display state, the number of categories viewable along the horizontal axis 642 is four corresponding to the years 2003 through 2006.

In FIG. 6B, the GUI 640 has transitioned to a second display state in response to a swipe, drag, or flick gesture 643 to pan across the horizontal axis 642. The second display state corresponds to the ending point 643B of the swipe, drag, or flick gesture 643. In the second display state, the number of categories viewable along the horizontal axis 642 is still four but now correspond to the years 2007 and 2010. It will be appreciated that while different chart values may be displayed as a result of the swipe, drag, or flick gesture 643, the underlying chart values are not changed by the swipe, drag, or flick gesture.

When panning across the horizontal axis with a swipe, drag, or flick gesture, one or more categories viewable along the horizontal axis at the start of the pan across operation are replaced with one or more categories that are not viewable at the start of the pan across operation. How viewable categories are replaced depends on the general direction of the drag, swipe, or flick gesture. In particular, according to one embodiment, the chart categories of the entire chart data set are viewed as being ordered by value from lowest to highest according to an ordering criterion. For example, in the example of FIGS. 6A and 6B, assuming the entire chart data spans the years 2003 to 2010, the chart categories may be viewed as being ordered by year from the earliest year 2003 to the latest year 2010.

According to some embodiments, if the direction of the drag, swipe, or flick gesture is generally right to left, then the "window" of categories viewable in the GUI continuously shifts higher in the order of categories such that the leftmost viewable category appears to move off the left edge of the GUI, the next leftmost viewable category appears to shift left to replace the leftmost viewable category that is now no longer viewable, and so on up to the rightmost viewable category. The rightmost viewable category appears to shift left to take the space along the horizontal axis previously occupied by the next rightmost viewable category, and the space along the horizontal axis previously occupied by the rightmost viewable category is replaced by the previously unviewable category that is next higher in the order after the rightmost viewable category. This shifting continues throughout the drag, swipe, or flick gesture until the gesture is stopped by the user or until the highest ordered chart category is displayed on the GUI.

According to some embodiments, if the direction of the drag, swipe, or flick gesture is generally left to right, then the "window" of categories viewable in the GUI continuously shifts lower in the order of categories such that the rightmost viewable category appears to move off the right edge of the GUI, the next rightmost viewable category appears to shift right to replace the rightmost viewable category that is now no longer viewable, and so on up to the leftmost viewable category. The leftmost viewable category appears to shift right to take the space along the horizontal axis previously occupied by the next leftmost viewable category, and the space along the horizontal axis previously occupied by the leftmost viewable category is replaced by the previously unviewable category that is next lower in the order below the leftmost viewable category. This shifting continues throughout the drag, swipe, or flick gesture until the gesture is stopped or until the lowest ordered chart category is displayed on the GUI.

In some embodiments of the invention, the transition between the first display state and the second display state is animated such that the user can view chart categories and corresponding chart value shifting along the horizontal axis as the user performs the drag, swipe, or flick gesture operation to pan across the horizontal axis.

In some embodiments of the invention, pan across the horizontal axis operation is operable only if and while the drag, swipe, or flick gesture has a horizontal orientation as opposed to a vertical orientation. The orientation of the drag, swipe, or flick gesture may be determined based on an angular measurement of one or more circles in which the radius of each circle is defined by the initial contact point of the drag, swipe, or flick gesture and a current contact point of the drag, swipe, or flick gesture.

While in the embodiment of FIGS. 6A-B, the contact points 643A and 643B of the drag, swipe, or flick gesture 643 are directed to the horizontal axis 642, in other embodiments the contact points of the drag, swipe, or flick gesture 643 are directed to other areas of the GUI 640.

In some embodiments, a drag, swipe, or flick gesture to pan across the horizontal axis can be used to reveal currently unviewable chart values. For example, in FIG. 6B, the chart values for years 2007, 2008, 2009, and 20010 were made viewable within the GUI 640 viewing area by the right to left drag, swipe, or flick gesture 643 to pan across the horizontal axis 642. An arrow or other indicator may be displayed nearer to right side of the touch screen or GUI when the chart value corresponding to the highest ordered chart category is not currently viewable because of the current pan position. As a right to left drag, swipe, or flick gesture is performed to pan across the horizontal across and the chart value corresponding to the highest ordered chart category becomes viewable, the arrow or indicator nearer to the right side of the touch screen or GUI may disappear. Similarly, an arrow or other indicator may be displayed nearer to left side of the touch screen or GUI when the chart value corresponding to the lowest ordered chart category is not currently viewable because of the current pan position. As a left to right drag, swipe, or flick gesture is performed to pan across the horizontal across and the chart value corresponding to the lowest ordered chart category becomes viewable, the arrow or indicator nearer to the left side of the touch screen or GUI may disappear.

4.1.6 Hiding Display of a Category

Figure 7A:
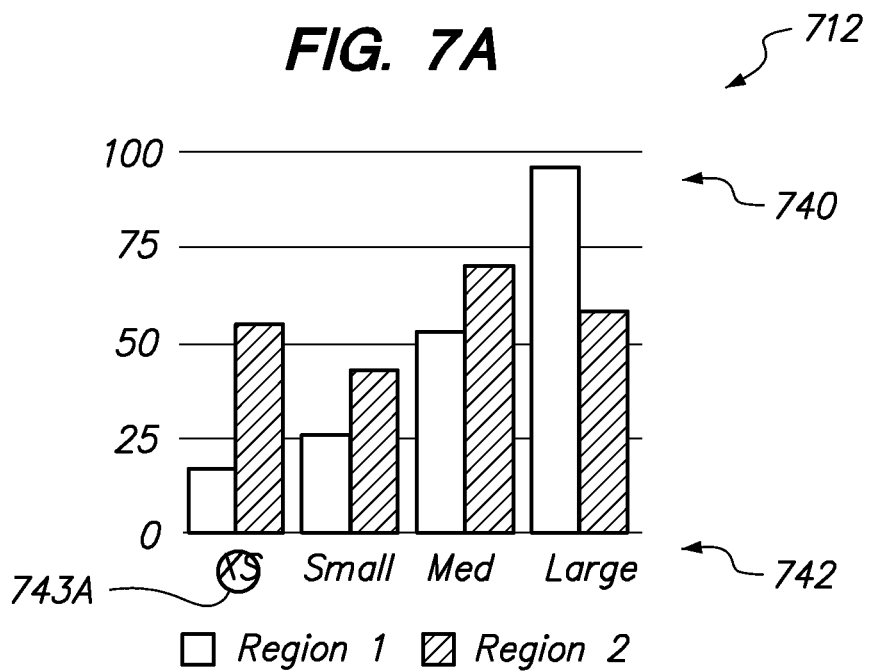
Figure 7B:
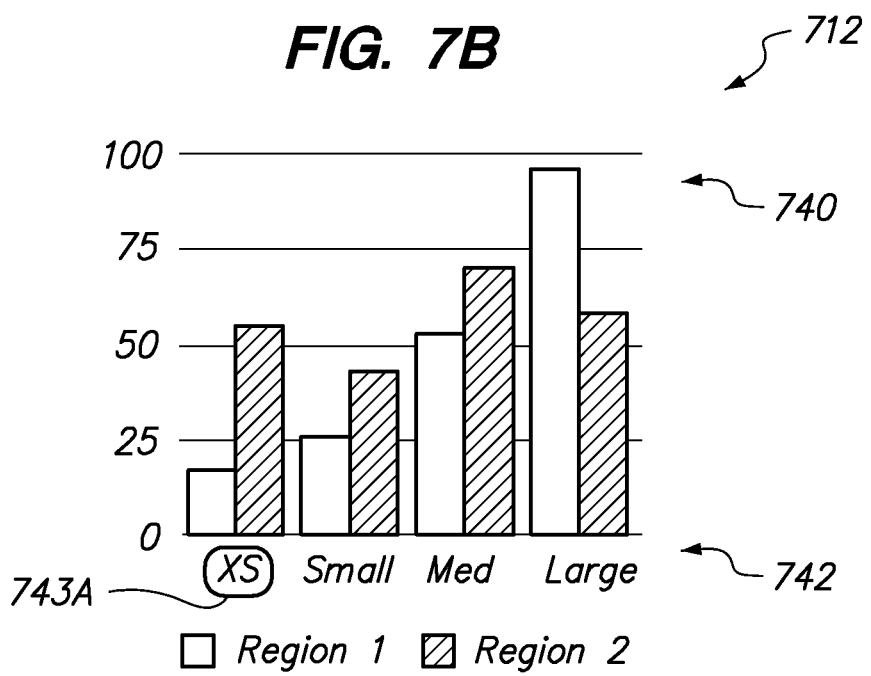

According to an embodiment, the user may hide display of a horizontal axis category with a press and drag gesture directed to the horizontal axis category label of the horizontal axis category to be hidden. For example, FIGS. 7A-C illustrate a GUI 740 displayed on a touch screen 712 at various points during the performance of a press and drag gesture 743 to hide display of a horizontal axis category. In FIG. 7A, the press and drag gesture 743 begins with a press gesture at contact point 743A directed to the horizontal axis category label "XS". After the user has maintained the press gesture for a sufficient amount of time (e.g., more than one second), a visual indication is provided to the user to indicate that the horizontal axis category is ready to be moved (as described below with respect to FIGS. 8A-C) or hidden. For example, the horizontal axis category label may be highlighted or other visual indication provided on the GUI 740 to indicate to the user that the horizontal axis category is ready to be moved or hidden. When the horizontal axis category is ready to be moved or hidden, if the user desires to hide display of the selected horizontal axis category, then user may drag the initial contact point 743A slightly away from the horizontal axis 742 and then release contact with touch screen 712. Upon releasing contact with the touch screen 712, the selected horizontal axis category is hidden from display on the GUI 740 as shown in FIG. 7C.

4.1.7 Moving a Category Along the Horizontal Axis

Figure 8B:
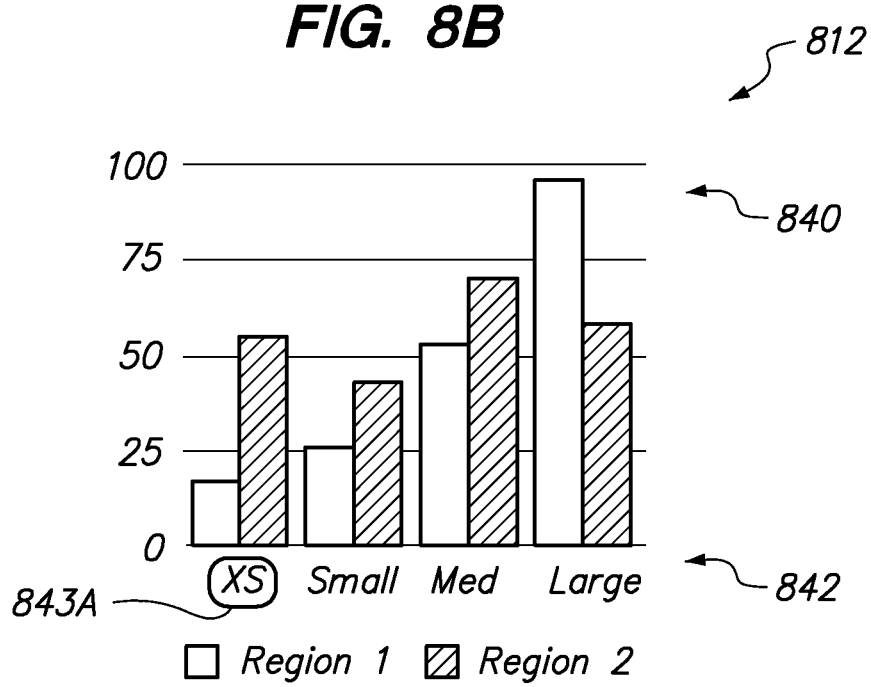
Figure 8C:
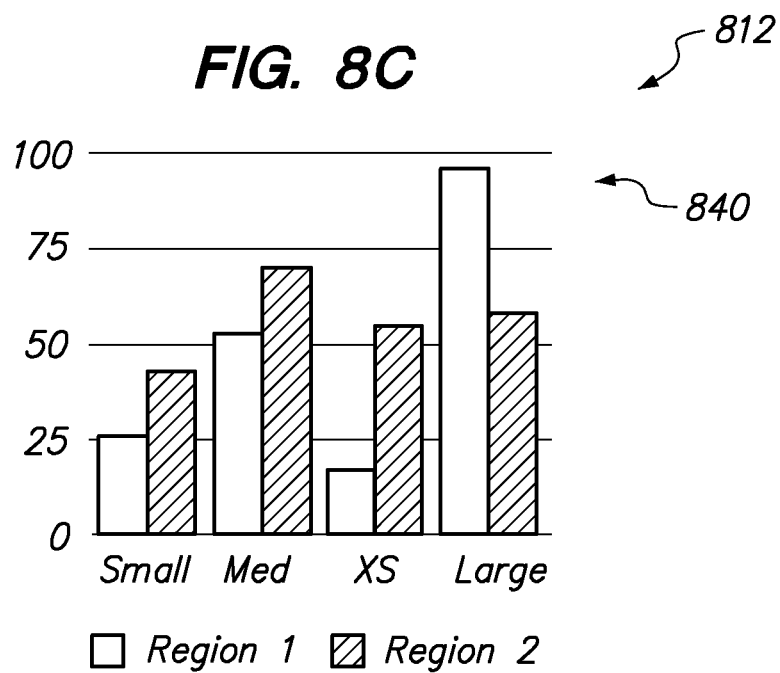

According to an embodiment, the user may move a horizontal axis category along the horizontal axis of a column chart with a press and drag gesture directed to the horizontal axis category label of the horizontal axis category to be moved. For example, FIGS. 8A-C illustrate a GUI 840 displayed on a touch screen 812 at various points during the performance of a press and drag gesture 843 to move the horizontal axis category "XS" along the horizontal axis 842 to a new location between horizontal axis categories "Med" and "Large" as shown in FIG. 8C. In FIG. 8A, the press and drag gesture 843 begins with a press gesture at contact point 843A directed to the horizontal axis category label "XS". After the user has held the press gesture for a sufficient amount of time (e.g., more than one second), a visual indication is provided to the user to indicate that the horizontal axis category is ready to be moved. For example, the horizontal axis category label may be highlighted or other visual indication provided on the GUI 840 to indicate to the user that the horizontal axis category is ready to be moved. When the horizontal axis category is ready to be moved, the user may drag the initial contact point 843A along (e.g., substantially in parallel with) the horizontal axis 842 and then release contact with touch screen 812 at a target location along the horizontal axis 842. Upon releasing contact with the touch screen 812, the selected horizontal axis category is moved along the horizontal axis 842 to a point corresponding to the release point of the press and drag gesture 843, as shown in FIG. 8C.

4.1.8 Sorting Horizontal Axis Categories in Ascending Order

According to an embodiment, when a column chart presents more than one sub-category per horizontal axis category, user may perform a touch gesture to sort the horizontal axis categories in ascending order by one of the sub-categories selected by the user. FIGS. 9A-B illustrate a GUI 940 displayed on a touch screen 912 at various points during the performance of a touch gesture 943 to sort categories along the horizontal axis of a column chart in ascending order according to a selected sub-category, according to an embodiment of the invention.

In the example of FIG. 9A, the GUI 940 displayed on the touch screen 912 includes a column chart displayed in a first display state for comparing values across year-based categories. Each year-based category contains two sub-categories designated in the example as "Region 1" and "Region 2". The column chart includes a leftmost column and a rightmost column for each sub-category corresponding to the leftmost and rightmost horizontal axis categories. In particular, the leftmost columns for the "Region 1" and "Region 2" sub-categories correspond to the "2007" horizontal axis category and the rightmost columns for the "Region 1" and "Region 2" sub-categories correspond to the "2010" horizontal axis category.

According to one embodiment, the user may sort the horizontal axis categories in ascending order according to a selected sub-category by performing a drag gesture to drag the leftmost column of the selected sub-category to a position at least partially overlapping the rightmost column of the sub-category. For example, as depicted FIG. 9A, the user starts a drag gesture at contact point 943A, drags the leftmost column of the "Region 2" sub-category until the column is at least partially overlapping the rightmost column of the "Region 2" sub-category, and releases contact from the touch screen at contact point 943B. The leftmost column may be animated to move along with the user's drag gesture across the touch screen 912 so that the user can visually track progress of the drag operation. In addition, a visual indication may be provided to the user when the leftmost column being dragged overlaps the rightmost column of the sub-category such that the user is aware that stopping contact with the touch screen 912 at the current contact point will trigger the sort operation. For example, the visual indication could involve visually highlighting or otherwise changing the visual appearance of the leftmost column being dragged and/or the rightmost column of the selected sub-category. In FIG. 9B, as a result of this drag gesture, the GUI 940 has changed to a second display state in which the horizontal axis categories are sorted in ascending order according to the "Region 2" sub-category.

In the embodiment just described, a drag gesture is performed to sort the horizontal axis in ascending order according to a selected sub-category. In other embodiments, other gestures are used. For example, the user may be required to perform a press and drag gesture instead of just a drag gesture. In this case, after the user has performed the press portion of the press and drag gesture for a sufficient amount of time (e.g., more than one second), the GUI may provide an indication that the leftmost column of the selected sub-category is ready to be dragged. For example, the leftmost column of the selected sub-category may be highlighted or otherwise change appearance to indicate that it is ready to be dragged.

4.1.9 Sorting Horizontal Axis Categories in Descending Order

According to an embodiment, when a column chart presents more than one sub-category per horizontal axis category, user may perform a touch gesture to sort the horizontal axis categories in descending order by one of the sub-categories selected by the user. FIGS. 10A-B illustrate a GUI 1040 displayed on a touch screen 1012 at various points during the performance of a touch gesture 1043 to sort categories along the horizontal axis 1042 of a column chart in descending order according to a selected sub-category, according to an embodiment of the invention.

According to one embodiment, the user may sort the horizontal axis categories in descending order according to a selected sub-category by performing a drag gesture to drag the rightmost column of the selected sub-category to a position at least partially overlapping the leftmost column of the sub-category. For example, as depicted FIG. 10A, the user starts a drag gesture at contact point 1043A, drags the rightmost column of the "Region 1" sub-category until the column is at least partially overlapping the leftmost column of the "Region 1" sub-category, and releases contact from the touch screen at contact point 1043B. In FIG. 10B, as a result of this drag gesture, the GUI 1040 has changed to a second display state in which the horizontal axis categories are sorted in descending order according to the "Region 1" sub-category.

4.1.10 Comparing Data Points

According to one embodiment of the invention, the user may compare two data points of a column chart by performing a first tap gesture on a first column corresponding to one of the two data points and performing a second tap gesture on a second column correspond to the other of the two data points. In response to performing the second tap gesture, comparison data relevant to the two selected data points is displayed on the GUI. For example, as shown in FIG. 11B, in response to the second tap gesture at contact point 1143B shown in FIG. 11A, a balloon is shown on the GUI 1140 that presents comparison data. In this example, the comparison data provides a difference between two numerical data points (+15) and a percentage increase between the two numerical data points (+27.2%). However, it should be understood that the comparison data that is shown on the GUI is not limited to any particular type of data or comparison operation and any comparison data suitable for the type of the selected data points may be presented. Generally, the comparison data can be any information that reflects at least the two selected data points or any information generated by performing one or more operations that accepts at least the two selected data points as input. In addition, it should be understood that the comparison data need not be shown in a balloon as depicted in FIG. 11B. The comparison data may be presented using other GUI elements such as, as examples, in a dialog, in a pop-up window, or other overlay.

Figure 12A:
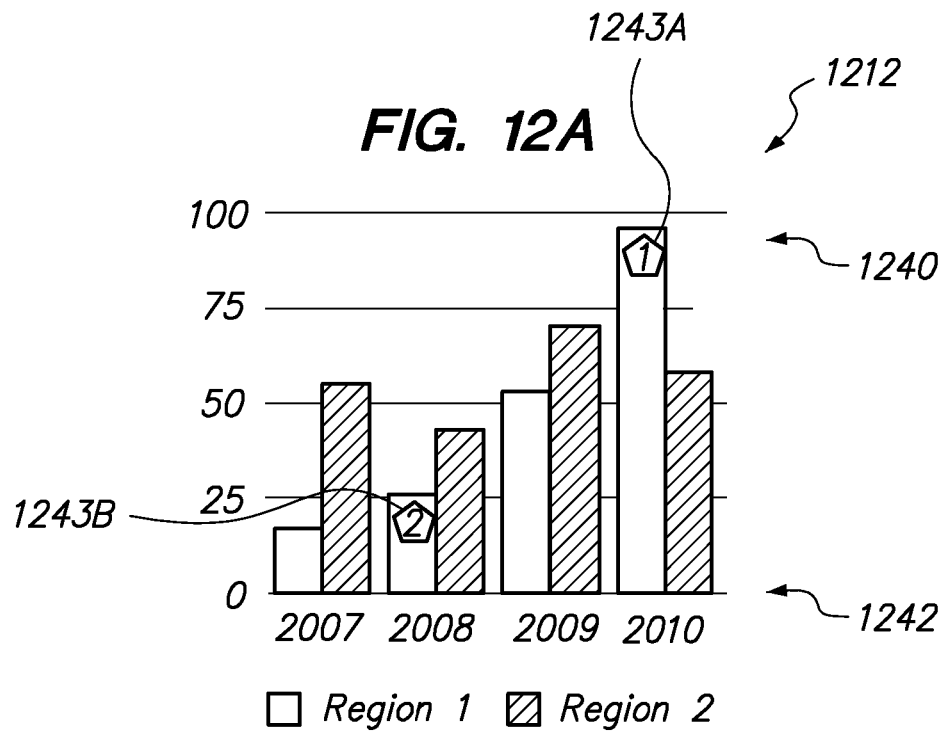
FIGS. 12A-B illustrate a GUI displayed on a touch screen at various points during the performance of a touch gesture to compare data points of a column chart, according to an embodiment of the invention.
Figure 12B:
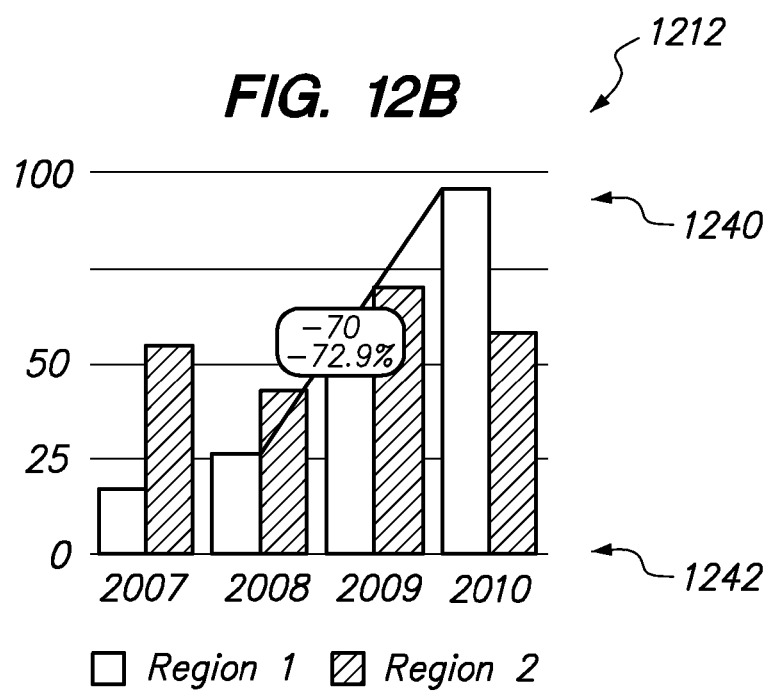

In one embodiment, the order of the tap gestures determines the direction of the comparison between the two selected data points relative to the horizontal axis categories. For example, in FIG. 11B, since the second tap gesture 1143B is to the "Region 2" sub-category of the "2009" horizontal axis category and the first tap gesture 1143A is to the "Region 2" sub-category of the "2007" horizontal axis category as shown in FIG. 11A, the comparison data shown in FIG. 11B reflects a comparison between the two selected data points in the positive direction along the horizontal axis 1242. In contrast, as shown in FIG. 12B, since the second tap gesture 1243B is to the "Region 1" sub-category of the "2008" horizontal axis category and the first tap gesture is to the "Region 1" sub-category of the "2010" horizontal axis category as shown in FIG. 12A, the comparison data show in FIG. 12B reflects a comparison between the two selected data points in the negative direction along the horizontal axis 1242.

4.1.11 Showing More Sub-Categories

Figure 13A:
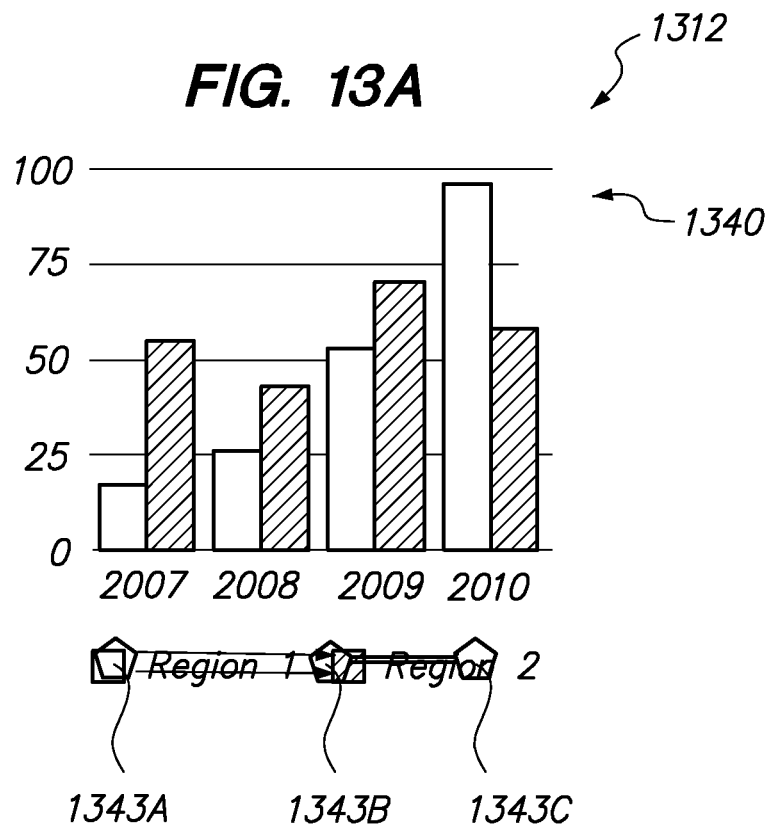
FIGS. 13A-B illustrate a GUI displayed on a touch screen at various points during the performance of a touch gesture to show more sub-categories on a column chart, according to an embodiment of the invention.
Figure 13B:
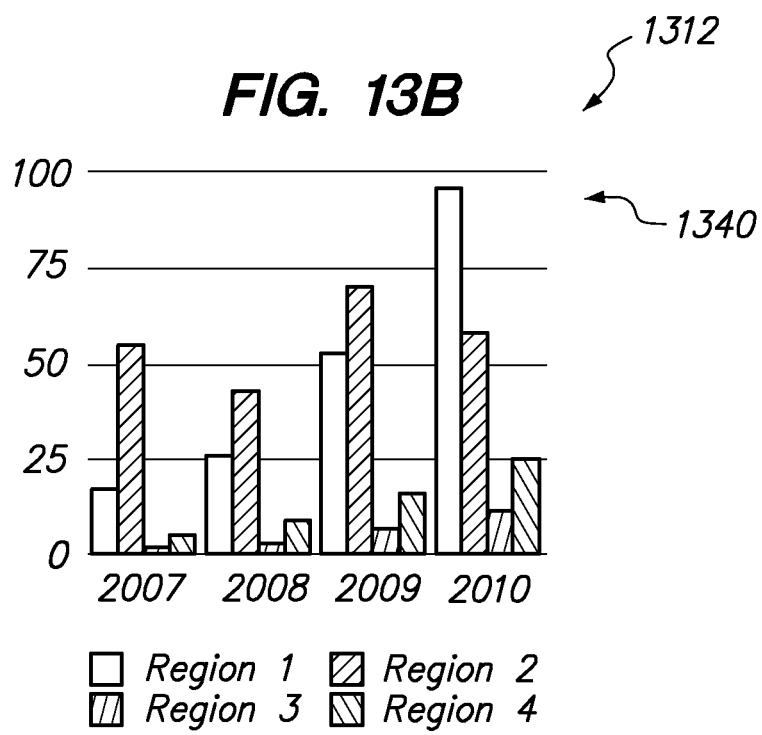

In one embodiment, a user may perform a spread gesture directed to the sub-category legend of a column chart to reveal additional sub-categories that are currently not charted on the column chart. The set of all available sub-categories is considered as an ordered set. As the spread gesture is performed sub-categories are revealed in the set order. This is shown by example in FIGS. 13A-B. As shown in FIG. 13A, a spread gesture 1343 is directed to the sub-category legend area of the GUI 1340. As a result of the spread gesture, additional sub-categories "Region 3" and "Region 4" are charted on the GUI 1340 as shown in FIG. 13B.

In one embodiment, the extent of the spread gesture determines how many additional sub-categories are revealed. For example, at or near the start of the spread gesture 1343 the sub-category "Region 3" may be charted and then as the spread gesture 1343 continues and the contact points of the spread gesture 1343 become farther apart the sub-category "Region 4" may be charted. Thus, in this embodiment, the user can selectively reveal additional sub-categories with a spread gesture.

In another embodiment, a pinch gesture directed to the sub-category legend area of the GUI may be used to reveal additional sub-categories instead of a spread gesture.

4.1.12 Showing Fewer Sub-Categories

Figure 14A:
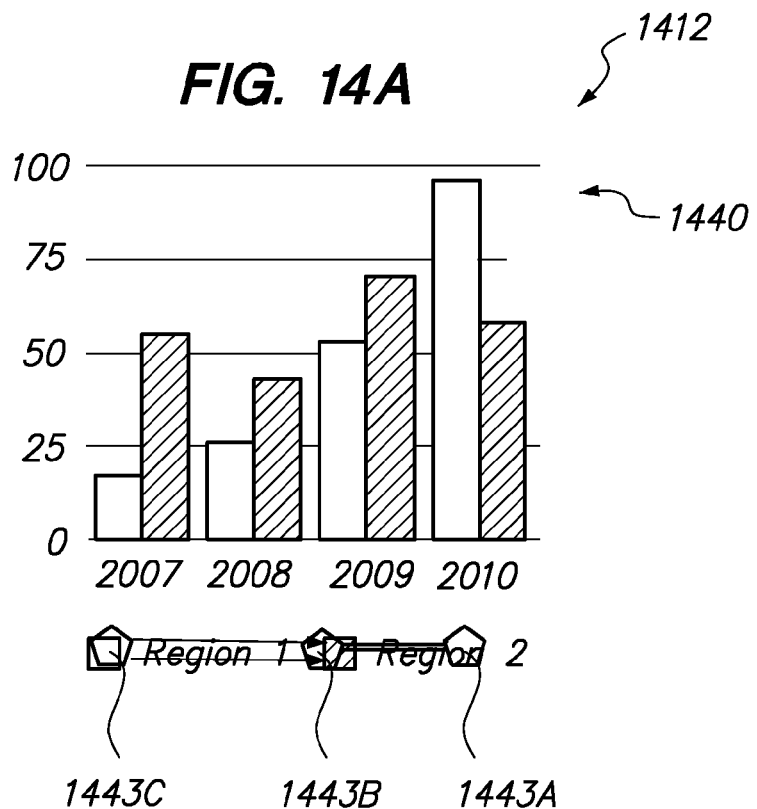
FIGS. 14A-B illustrate a GUI displayed on a touch screen at various points during the performance of a touch gesture to show fewer sub-categories on a column chart, according to an embodiment of the invention.
Figure 14B:
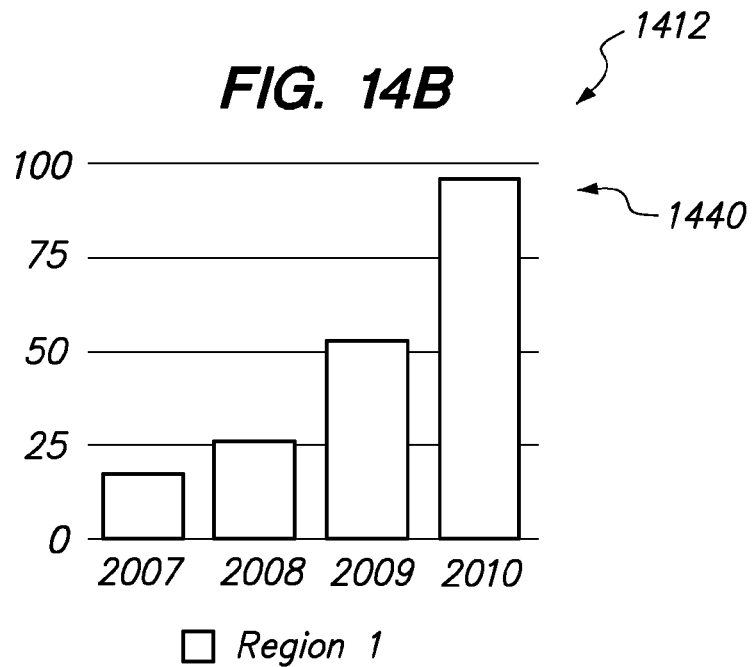

In one embodiment, a user may perform a pinch gesture directed to the sub-category legend of a column chart to hide currently displayed sub-categories from the column chart. The set of all available sub-categories is considered as an ordered set. As the pinch gesture is performed sub-categories are hidden in the set order. This is shown by example in FIGS. 14A-B. As shown in FIG. 14A, a pinch gesture 1443 is directed to the sub-category legend area of the GUI 1440. As a result of the pinch gesture, currently displayed sub-category "Region 2" is hidden from the GUI 1440 as shown in FIG. 14B.

In one embodiment, the extent of the pinch gesture determines how many currently displayed sub-categories are hidden. Thus, in this embodiment, the user can selectively hide currently displayed sub-categories with a pinch gesture.

In another embodiment, a spread gesture directed to the sub-category legend area of the GUI may be used to hide currently displayed sub-categories instead of a pinch gesture.

4.1.13 Panning Over Sub-Categories

In one embodiment, a user can perform a multi-touch and drag gesture directed to the sub-category legend area of a column chart to pan across sub-categories of the column chart.

For example, FIGS. 15A-B illustrate a GUI 1540 displayed on a touch screen 1512 at various points during the performance of a multi-touch and drag gesture 1543 to pan across sub-categories of a column chart, according to an embodiment of the invention. In this example, the direction of the multi-touch and drag is from left to right and results in the chart depicted in FIG. 15B in which sub-categories "Region 1" and "Region 2" are replaced by sub-categories "Region 3" and "Region 4". More generally, all available sub-categories are considered as an ordered set. Higher ordered sub-categories replace lower ordered sub-categories on the GUI 1540 as the multi-touch and drag gesture moves from left to right. In contrast, lower ordered sub-categories replaced higher ordered sub-categories on the GUI as the multi-touch and drag gesture moves from right to left. For example, if the user wanted to return to the previous displayed set of sub-categories shown in FIG. 15A after performing the left to right multi-touch and drag gesture 1543, the user could perform a right to left multi-touch and drag gesture directed to the sub-category legend area of the GUI 1540. This right to left multi-touch and drag gesture would replace sub-categories "Region 3" and "Region 4" on the GUI 1540 as shown in FIG. 15B with sub-categories "Region 1" and "Region 2" as shown in FIG. 15A.

4.1.14 Hiding a Specific Sub-Category

Figure 16A:
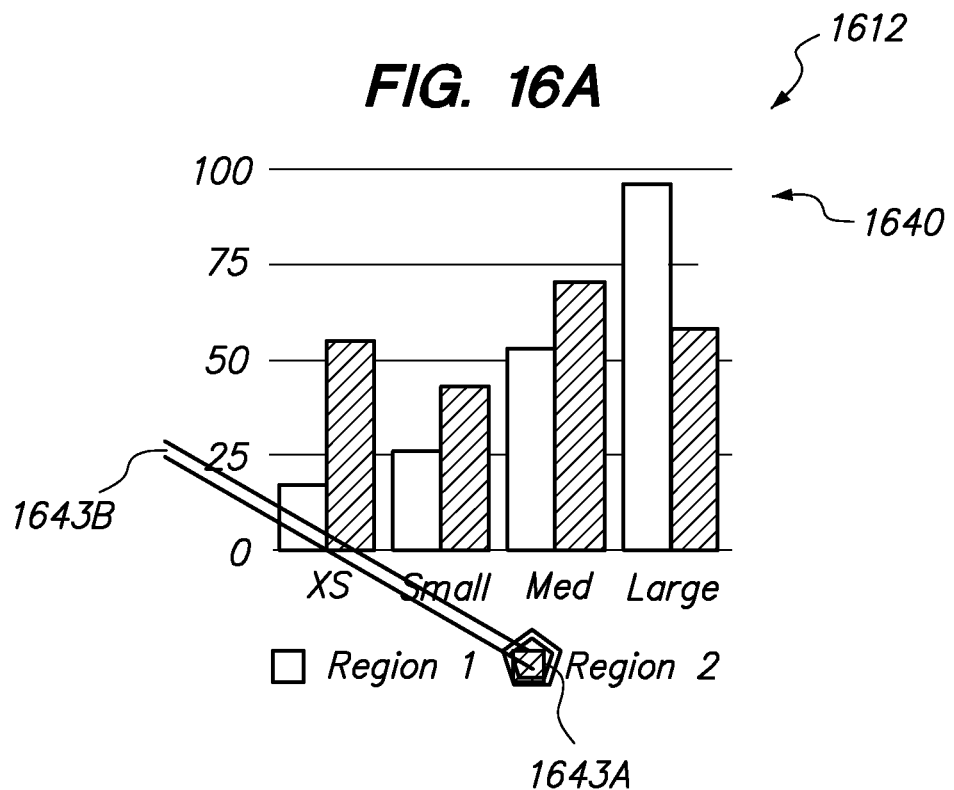
FIGS. 16A-B illustrate a GUI displayed on a touch screen at various points during the performance of a touch gesture to hide a selected sub-category of a column chart, according to an embodiment of the invention.
Figure 16B:
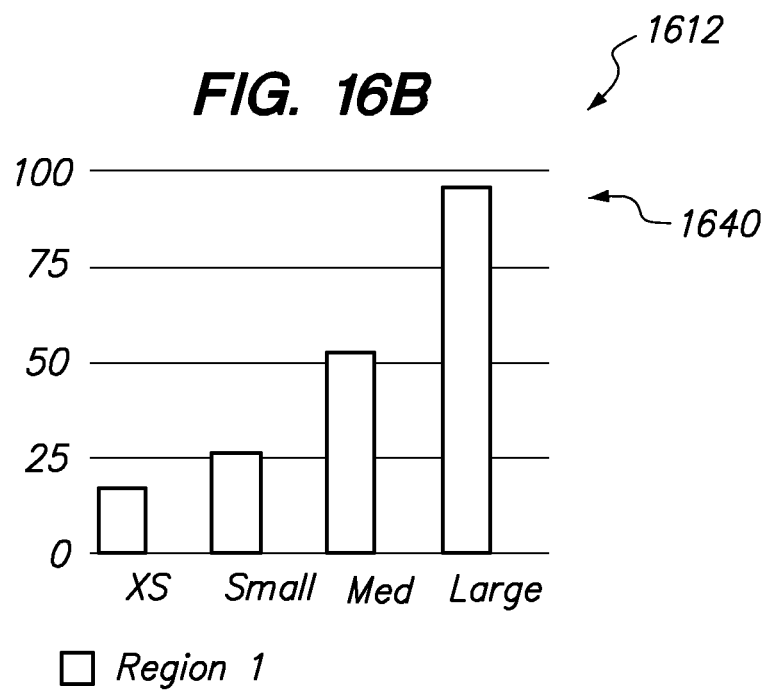

According to one embodiment of the invention, the user may perform a press gesture directed to the label of a target sub-category displayed in the sub-category legend area of a column chart followed by a drag gesture to drag the selected label off an edge of the GUI or touch screen to hide display of the target sub-category. For example, FIGS. 16A-B illustrate a GUI 1640 displayed on a touch screen 1612 at various points during performance of a press and drag gesture 1643 to hide display of the selected sub-category "Region 2". To select the target sub-category to be hidden, the user performs a press gesture directed to the sub-category label of the target sub-category. For example, in FIG. 16, the sub-category "Region 2" is selected as the target sub-category with a press gesture 1843A directed to the sub-category label for the target sub-category "Region 2". To hide the target sub-category, the user drags the selected sub-category label off an edge of the GUI or touch screen and then releases contact with the touch screen. For example, in FIG. 16, the target sub-category "Region 2" is hidden by dragging 1643B the selected sub-category label off an edge of the GUI 1640. In another embodiment, the target sub-category "Region 2" is hidden by dragging the selected sub-category label off an edge of the touch screen 1612. A visual indicator may be provided to the user on the touch screen to indicate that the user has performed the press gesture directed to a sub-category label for a sufficient amount of time such that the selected label is now ready to be dragged. In addition, a visual indicator may be provided to the user on the touch screen when the selected sub-category label is sufficiently dragged off an edge of the GUI or touch screen such that releasing contact with the touch screen at that time will cause the selected sub-category to be hidden. The result of the press and drag gesture 1643 to hide the sub-category "Region 2" is shown in FIG. 16B.

4.1.15 Revealing a Sub-Category

Figure 17A:
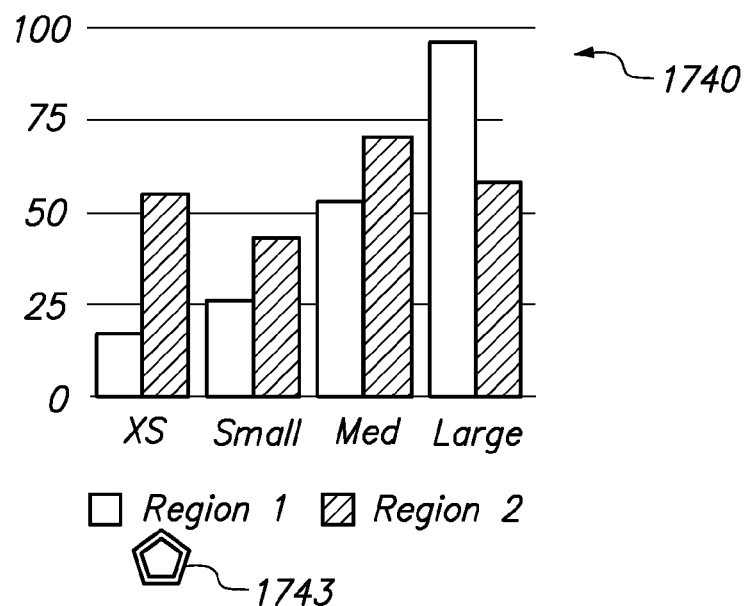
FIGS. 17A-B illustrate a GUI displayed on a touch screen at various points during the performance of a touch gesture to show a selected sub-category on a column chart, according to an embodiment of the invention.
Figure 17B:
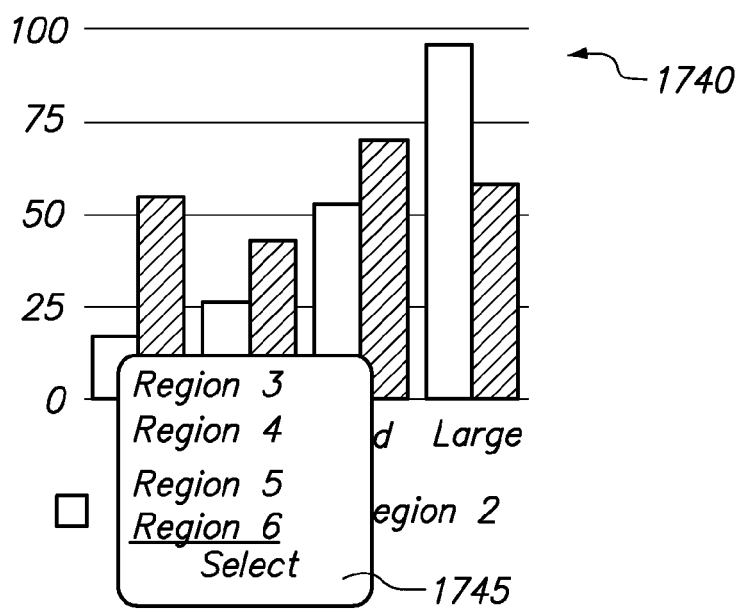

According to one embodiment of the invention, the user may perform a press gesture near the sub-category legend area of a column chart to reveal a menu for selecting an available sub-category to add to the column chart. For example, FIGS. 17A-B illustrate a GUI 1740 displayed on a touch screen 1712 at various points during performance of a press gesture 1743 to reveal a selection menu 1745 presenting available sub-categories that are currently not displayed on the GUI 1740. The user may select one of the available sub-categories with, for example, a tap gesture directed to the selection menu 1745.

4.1.16 Aggregating Sub-Categories

Figure 18A:
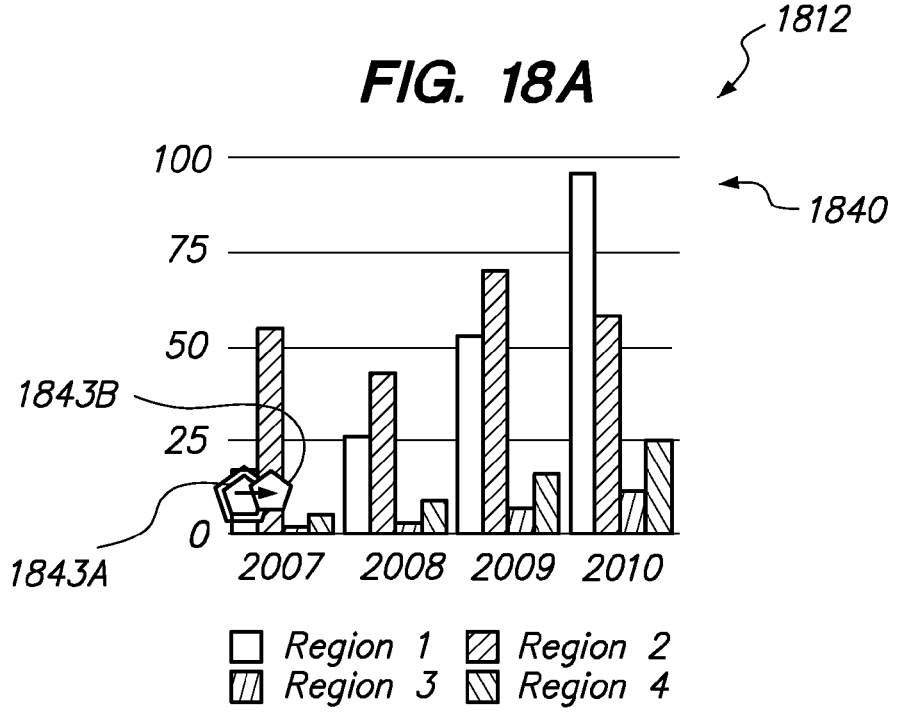
FIGS. 18A-B illustrate a GUI displayed on a touch screen at various points during the performance of a touch gesture to aggregate sub-categories of a column chart, according to an embodiment of the invention.
Figure 18B:
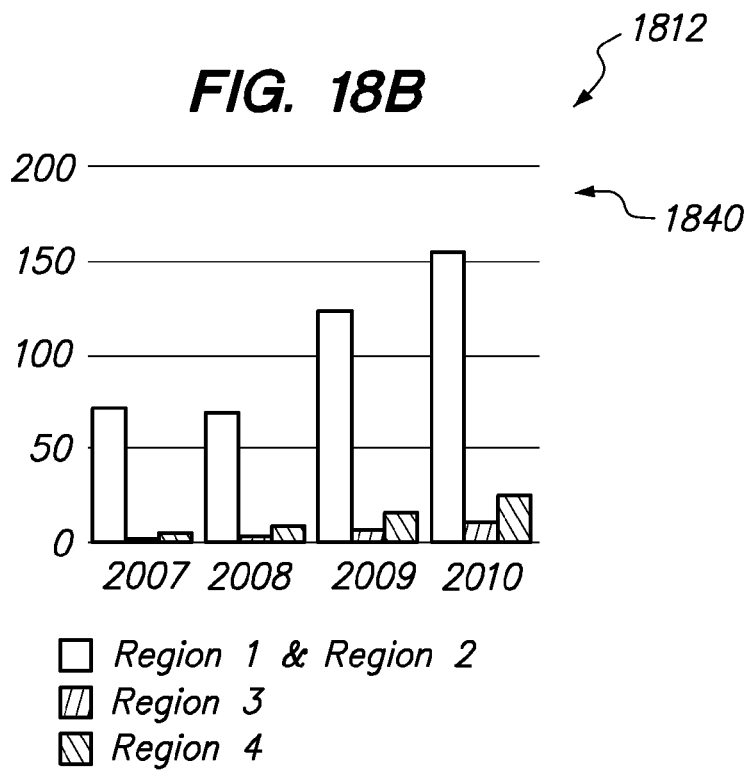

According to one embodiment of the invention, the user may perform a press and drag gesture to aggregate sub-categories of a column chart. For example, FIGS. 18A-B illustrate a GUI 1840 displayed on a touch screen 1812 at various points during the performance of a press and drag gesture 1843 to aggregate sub-category "Region 2" into "Region 1, according to an embodiment of the invention. To select the target sub-category to be aggregated into, the user performs a press gesture on a column of the target sub-category. For example, in FIG. 18A, the sub-category "Region 1" was selected as the target sub-category with a press gesture 1843A directed to the column for the sub-category "Region 1" in the "2007" horizontal axis category. To select the source sub-category that is to be aggregated into the target sub-category, the user drags the column selected with the press gesture so that it at least partially overlaps a column of the source sub-category and then releases contact with the touch screen 1812. For example, in FIG. 18A, the source sub-category "Region 2" is selected by dragging 1843B the column for the sub-category "Region 1" in the "2007" horizontal axis category onto the column for the sub-category "Region 2" in the "2007" horizontal axis category and contact with the touch screen 1812 is released at contact point 1843B. A visual indicator may be provided to the user to indicate that the user has performed the press gesture on a column for a sufficient amount of time such that the selected column is now ready to be dragged. In addition, a visual indicator may be provided to the user as the user drags the selected column when the selected column sufficiently overlaps a column for a source sub-category such that if the user releases contact with the touch screen at that point, the sub-categories will be aggregated.

In one embodiment, the target sub-category and the source sub-category are aggregated on a per horizontal axis category basis. For example, the result of the example aggregation operation of FIG. 18A is shown in FIG. 18B. Here, the sub-categories "Region 1" and "Region 2" are aggregated together in each of the year-based horizontal axis categories. Note that while in the example of FIG. 18B sub-category "Region 2" has been aggregated into "Region 1", "Region 1" could have just as easily been aggregated into "Region 2".

In one another embodiment, the user may aggregate sub-categories by directing tap gestures to the sub-category legend area of the GUI to select the sub-categories to be aggregated and then performing a pinch gesture to aggregate the selected categories. For example, FIGS. 19A-B illustrate a GUI 1940 displayed on a touch screen 1912 at various points during the performance of a touch gesture 1943 to aggregate sub-categories of a column chart, according to an embodiment of the invention. In FIG. 19A, sub-categories "Region 2", "Region 3", and "Region 4" are selected with tap gestures 1943A, 1943B, and 1943C respectively. Then, these sub-categories are aggregated with a pinch gesture 1943D. The result is shown in FIG. 19B. In the embodiment of FIGS. 19A-B, the sub-category first selected with a tap gesture (i.e., "Region 2") is the target sub-category into which subsequently selected sub-categories "Region 3" and "Region 4" are aggregated into. In other embodiments, another of the selected sub-categories, for example, the last selected sub-category, is the target sub-category into which all other selected sub-categories are aggregated into.

According to one embodiment of the invention, the user may perform a press and drag gesture to aggregate sub-categories of a stacked column chart. For example, FIG. 22A-B illustrate a GUI 2240 displayed on a touch screen 2212 at various points during the performance of a press and drag gesture 2243 to aggregate the "Region 4" into the "Region 3" sub-categories of a stacked column chart, according to an embodiment of the invention. As a result of the press and drag gesture 2243, the "Region 4" sub-category is aggregated into the "Region 3" sub-category on per-horizontal axis category basis as shown in FIG. 22B.

4.1.17 Disaggregating Sub-Categories

According to one embodiment, the user can disaggregate sub-categories by directing a double tap gesture to sub-category legend area. FIGS. 20A-B illustrate a GUI 2040 displayed on a touch screen 2012 at various points during the performance of a double tap gesture 2043 to disaggregate sub-categories "Region 2", "Region 3", and "Region 4". In this example, the double tap gesture 2043 is directed to the aggregated label in the sub-category legend area. The result of the double-tap gesture 2043 is shown in FIG. 20B in which it can be seen that sub-categories "Region 2", "Region 3", and "Region 4" have been disaggregated.

In another embodiment, the user can disaggregate sub-categories by directing a double tap gesture an aggregated column. FIGS. 21A-B illustrate a GUI 2140 displayed on a touch screen 2112 at various points during the performance of a double tap gesture 2143 to disaggregate sub-categories "Region 1" and "Region 2". In this example, the double tap gesture 2143 is directed to a column of the column chart that aggregates "Region 1" and "Region 2". The result of the double-tap gesture 2143 is shown in FIG. 21B in which it can be seen that sub-categories "Region 1" and "Region 2" have been disaggregated.

According to one embodiment, the user can disaggregate sub-categories of a stacked column chart by directing a double tap gesture to an aggregated portion of a stacked column. FIGS. 23A-B illustrate a GUI 2340 displayed on a touch screen 2312 at various points during the performance of a double tap gesture 2343 to disaggregate the "Region 3" and "Region 4" sub-categories of a stacked column chart by directing the double tap gesture 2343 to the aggregated portion of the stacked column for "2010" horizontal axis category. The result of the disaggregation is show in FIG. 23B.

4.1.18 Sorting Stacked Sub-Categories in Ascending Order

Figure 24A:
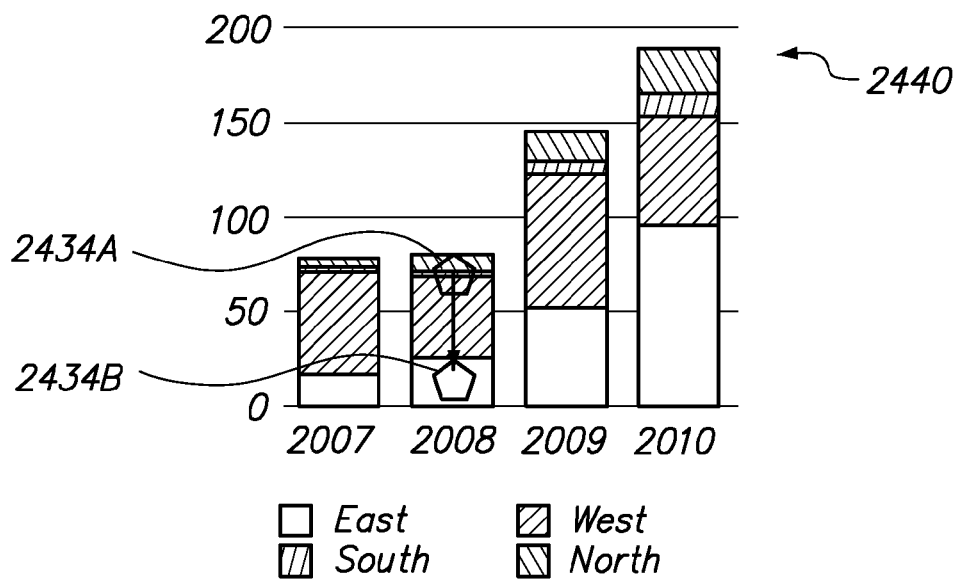
FIGS. 24A-B illustrate a GUI displayed on a touch screen at various points during the performance of a touch gesture to sort sub-categories of a stacked column chart in ascending order, according to an embodiment of the invention.
Figure 24B:

According to one embodiment, a user can sort sub-categories of a stacked column chart in ascending order by directing a drag gesture to a stacked column. For example, FIGS. 24A-B illustrate a GUI 2440 displayed on a touch screen 2412 at various points during the performance of a drag gesture 2443 that starts at contact point 2443A corresponding to the highest sub-category in the stacked column for the year "2008" and ends at contact point 2443B corresponding to the lowest sub-category in the stacked column for the year "2009" to sort sub-categories of a stacked column chart in ascending order, according to an embodiment of the invention. The result of the drag gesture 2443 is shown in FIG. 24B. As can be seen from FIG. 24B, the sub-categories "West", "East", "North", and "South" are re-stacked in the columns of the horizontal axis categories in ascending order of the sub-category's percentage of the total of all sub-categories. Accordingly, the "West" sub-category is stacked at the bottom of each column and the "South" sub-category is stacked at the top of each column as shown in FIG. 24B. In one embodiment, instead a drag gesture, a press and drag gesture is used to sort the sub-categories of a stacked column chart in ascending order.

4.1.19 Sorting Stacked Sub-Categories in Descending Order

According to one embodiment, a user can sort sub-categories of a stacked column chart in descending order by directing a drag gesture to a stacked column. For example, FIGS. 25A-B illustrate a GUI 2540 displayed on a touch screen 2512 at various points during the performance of a drag gesture 2543 that starts at contact point 2543A corresponding to the lowest sub-category in the stacked column for the year "2009" and ends at contact point 2543B corresponding to the highest sub-category in the stacked column for the year "2009" to sort sub-categories of a stacked column chart in descending order, according to an embodiment of the invention. The result of the drag gesture 2543 is shown in FIG. 25B. As can be seen from FIG. 25B, the sub-categories "West", "East", "North", and "South" are re-stacked in the columns of the horizontal axis categories in descending order of the sub-category's percentage of the total of all sub-categories. Accordingly, the "East" sub-category is stacked at the top of each column and the "South" sub-category is stacked at the bottom of each column as shown in FIG. 25B. In one embodiment, instead a drag gesture, a press and drag gesture is used to sort the sub-categories of a stacked column chart in descending order.

4.2 Manipulation of Bar Charts

While the above-described manipulations are described with respect to column charts in which vertical bars emanate perpendicularly from the horizontal axis, it will be appreciated that the above-described manipulations can be applied in similar manner with similar results to bar charts in which horizontal bars emanate perpendicularly from the vertical axis. The general difference between column charts and bar charts being that what is described above as occurring with respect to the horizontal axis of a column chart generally occurs with respect to the vertical axis of a bar chart and what is described above as occurring with respect to the vertical axis of a column chart generally occurs with respect to the horizontal axis of a bar chart.

4.3 Manipulation of Pie Charts

4.3.1 Collapsing Categories

According to one embodiment of the invention, a user may perform a drag or swipe gesture directed to a pie chart starting at a larger category of the pie chart and ending at a smaller category of the pie chart to successively collapse categories of the pie chart into a subsuming category starting with the smallest categories of the pie chart and proceeding from the smallest categories to larger categories as the drag gesture continues. The subsuming category may be labeled "Other" or another name that connotes that the category subsumes sub-categories.

Figure 26A:
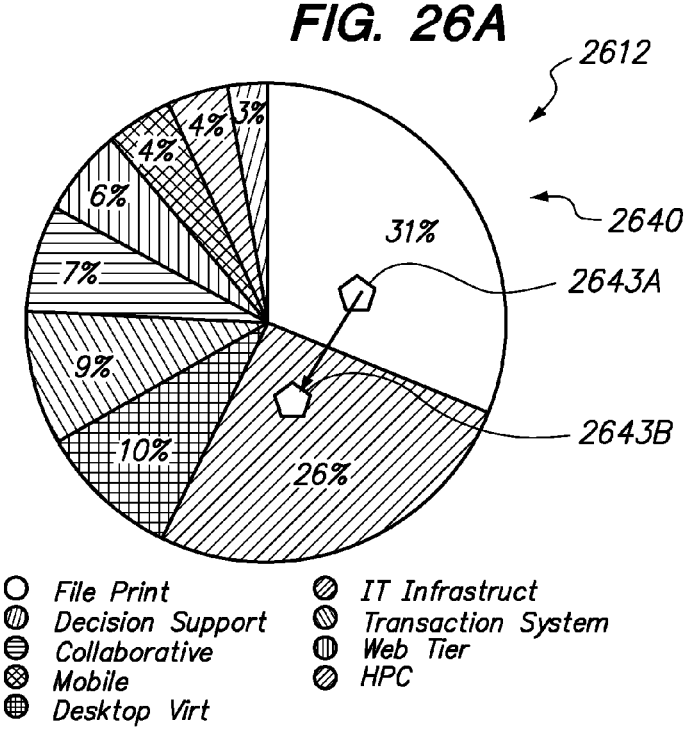
FIGS. 26A-B illustrate a GUI displayed on a touch screen at various points during the performance of a touch gesture to collapse categories of a pie chart into a subsuming category, according to an embodiment of the invention.
Figure 26B:
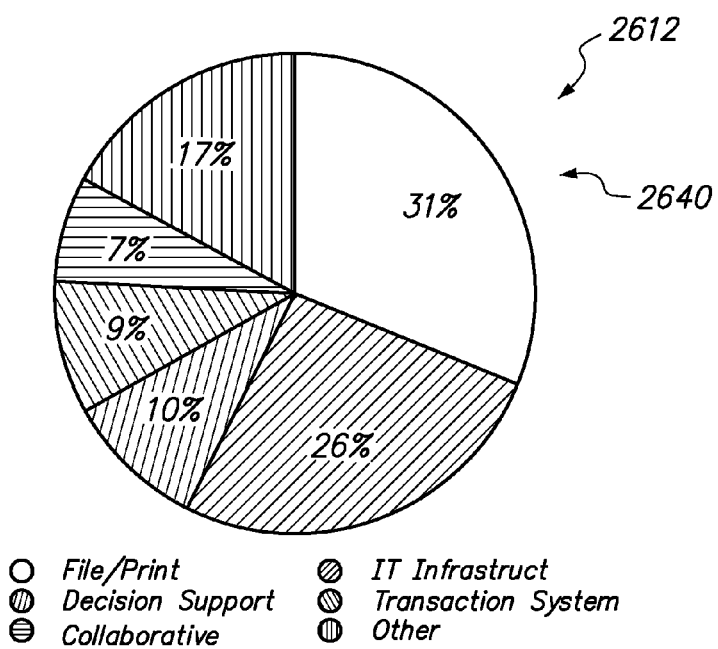

For example, FIGS. 26A-B illustrate a GUI 2640 displayed on a touch screen 2612 at various points during the performance of a drag or swipe gesture 2643 to successively collapse the categories "Desktop Virt. 3%", "HPC 4%", "Mobile 4%", and "Web Tier 6%" into a subsuming category "Other 17%" starting with the smallest categories "Desktop Virt 3%" and "HPC 4%" and proceeding to a larger category "Web Tier 6%" as the drag or swipe gesture 2643 proceeds from contact point 2643A to contact point 2643B. In another, embodiment, instead of a drag or swipe gesture, a pinch gesture is directed to a pie chart to collapse pie chart categories.

4.3.2 Expanding Categories

According to one embodiment of the invention, a user may perform a drag or swipe gesture directed to a pie chart starting at a smaller category of the pie chart and ending at a larger category of the pie chart to successively reveal subsumed categories of a subsuming category of the pie chart starting with the largest subsumed category of the pie chart and proceeding from the largest subsumed categories to the smallest subsumed category as the drag gesture continues.

Figure 27A:
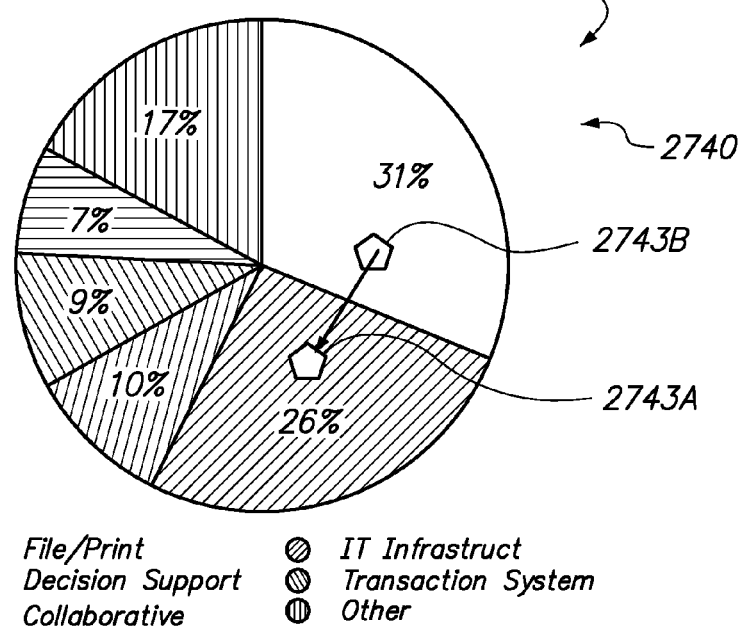
FIGS. 27A-B illustrate a GUI displayed on a touch screen at various points during the performance of a touch gesture to expand a subsuming category of a pie chart to reveal the subsumed sub-categories, according to an embodiment of the invention.
Figure 27B:
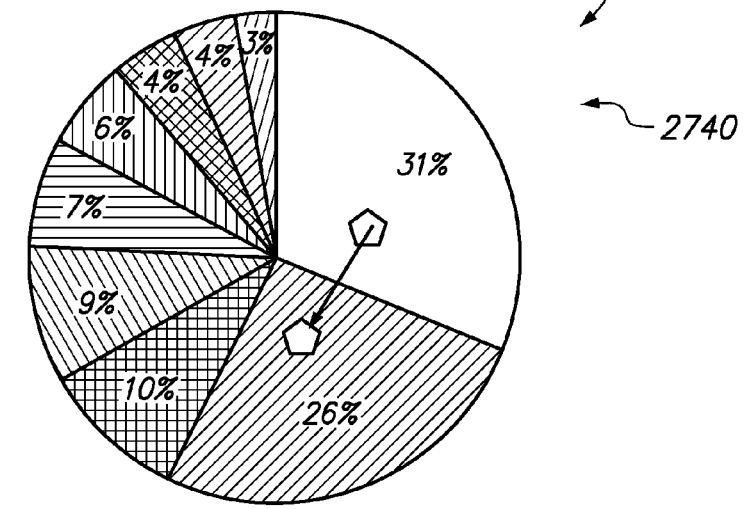

For example, FIGS. 27A-B illustrate a GUI 2740 displayed on a touch screen 2712 at various points during the performance of a drag or swipe gesture 2743 to successively reveal the subsumed categories "Web Tier 6%", "Mobile 4%", "HPC 4%", and "Desktop Virt. 3%" of subsuming category "Other 17%" in that order as the drag or swipe gesture 2743 proceeds from contact point 2743A to contact point 2743B. In another, embodiment, instead of a drag or swipe gesture, a spread gesture is directed to a pie chart to expand a subsuming pie chart category.

4.3.3 Combining Categories

Figure 28A:
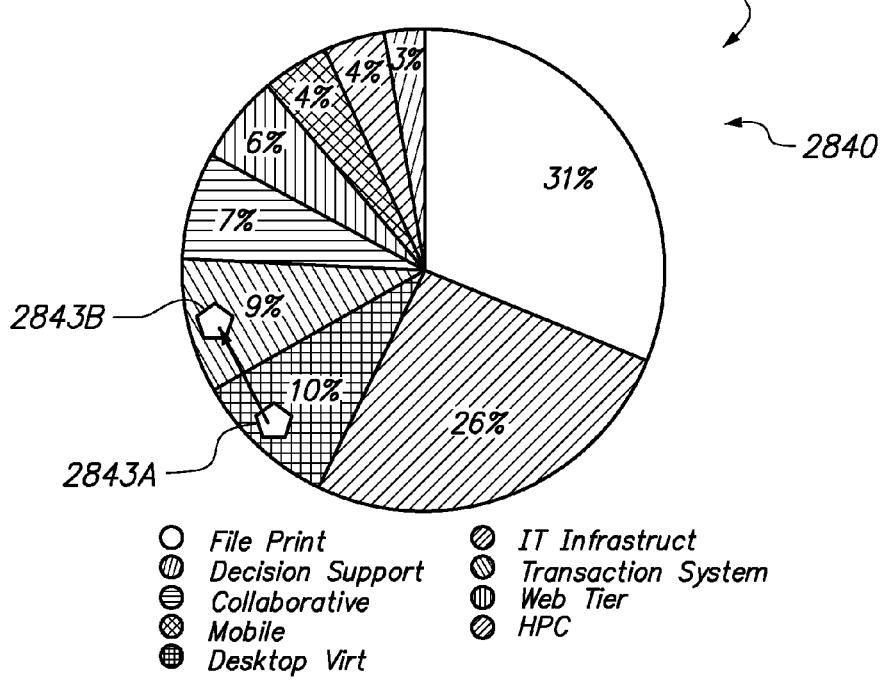
FIGS. 28A-B illustrate a GUI displayed on a touch screen at various points during the performance of a touch gesture to combine categories of a pie chart into a single category, according to an embodiment of the invention.
Figure 28B:
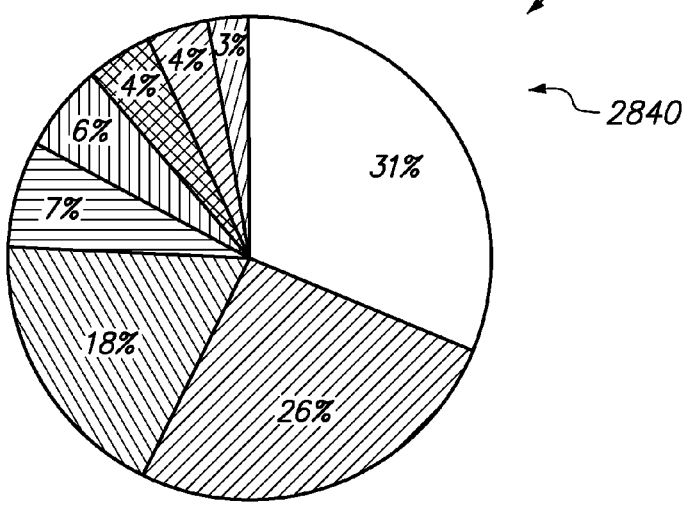

According to one embodiment of the invention, a user may perform a press and drag gesture directed to a pie chart starting at a first category of the pie chart and ending at a second category of the pie chart to successively collapse categories of the pie chart into a combination category. For example, FIGS. 28A-B illustrate a GUI 2840 displayed on a touch screen 2812 at various points during the performance of a press and drag gesture 2843 that starts 2843A at category "Decision Support 10%" and ends 2843B at category "Transaction Systems 9%" to produce combination category "Decision Support % Transaction Systems 18%" as shown in FIG. 28B.

4.3.4 Sorting Categories

Figure 29A:
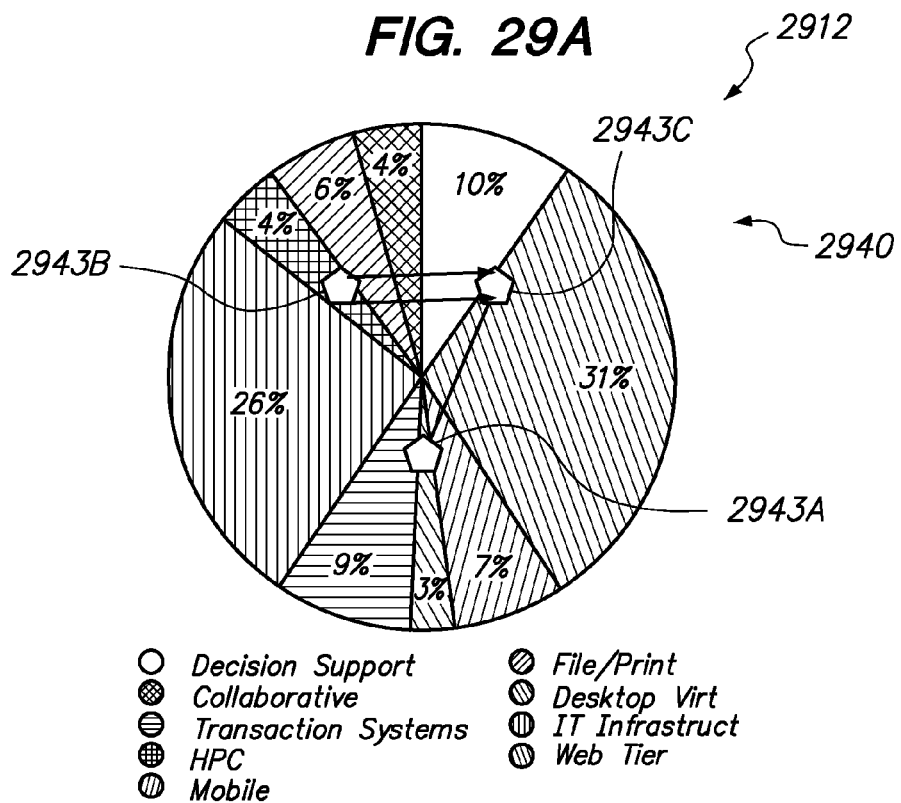
FIGS. 29A-B illustrate a GUI displayed on a touch screen at various points during the performance of a touch gesture to sort the categories of a pie chart in ascending order, according to an embodiment of the invention.
Figure 29B:
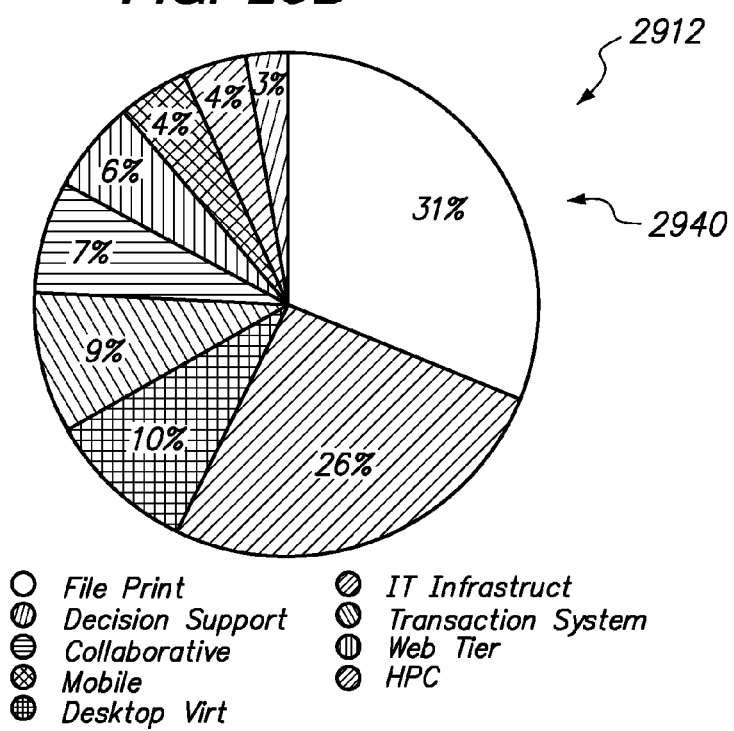

According to one embodiment of the invention, the user may perform a rotate gesture directed to a pie chart to sort categories in ascending order of pie chart percentage. FIGS. 29A-B illustrate a GUI 2940 displayed on a touch screen 2912 at various points during the performance of a rotate gesture 2943 to sort the categories of a pie chart in ascending order, according to an embodiment of the invention. The direction of the rotate gesture determines whether the sorted categories increase in the clockwise or counter-clockwise direction. In the example of FIG. 29A, the rotate gesture 2943 is performed in the clockwise direction. Consequently, the sorted categories increase in the counter-clockwise direction as shown in FIG. 29B. Alternatively, the sorted categories could increase in the same direction as the rotate gesture.

5.0 Example Device Configuration

Figure 30:
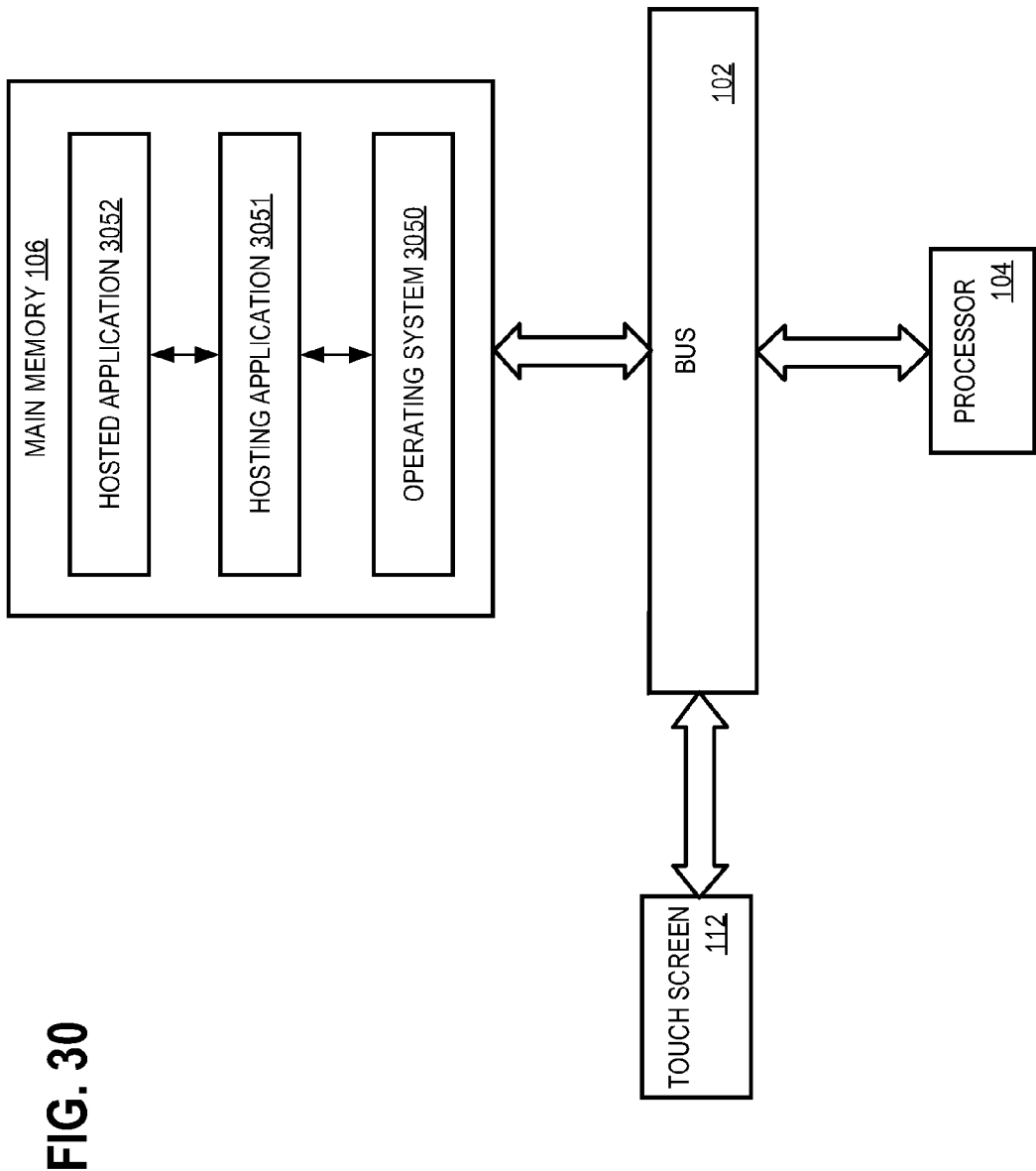
FIG. 30 is a block diagram illustrating an example configuration of the sample electronic device of FIG. 1 for implementing data visualization manipulation techniques described herein.

FIG. 30 is a block diagram illustrating an example configuration of the sample electronic device 100 of FIG. 1 for implementing data visualization manipulation techniques described herein. Some components depicted in FIG. 1 have been intentionally omitted in FIG. 30 for the purpose of providing a clear illustration.

In some embodiments of the invention, executable software components 3050, 3051, and 3052 are loaded in main memory 106 of the electronic device 100 (e.g., a mobile phone or tablet computer) for execution by processor 104. The executable software components include an operating system 3050, a hosting application 3051, and a hosted application 3052.

The operating system 3050 (e.g., Android, iOS, Symbian, RIM, Bada, Windows Phone, Windows Mobile, Linux, Unix, OS X, Windows) includes various software components and/or drivers for controlling and managing general system tasks (e.g., memory management, storage device control, power management, etc.) and facilitates communication between various hardware and software components.

The operating system 3050 also provides a mechanism for communicating touch events to hosting application 3051 when a user performs a touch gesture against the touch screen 112. Such touch events may correspond when the user contacts the touch screen 112, when there is movement of the contact and as the movement occurs across the touch screen 112, when contact with the touch screen 112 is broken. Such touch events communicated by the operating system 3050 to the hosting application 3051 may convey the position, velocity, direction, and/or acceleration of contact with the touch screen 112.

The hosting application 3051 executes hosted application 3052. In one embodiment, hosting application 3051 is a web browser (e.g., Android, Firefox, Kindle, Opera, Safari, Internet Explorer). The web browser includes various software components and/or drivers for retrieving, presenting, and traversing information resources on a data network.

Hosted application 3052 may be downloaded over a data network (e.g., the Internet) by hosting application 3051 for execution. In one embodiment, hosted application 3052 includes browser scripting instructions (e.g., JavaScript instructions, Hypertext Markup Language (HTML) instructions, Extensible Hypertext Markup Language (XHTML) instructions, Cascading Style Sheet (CSS) instructions) for responding to touch events and updating the display of data visualizations through hosting application 3051.

The hosting application 3051 provides an application programming interface (API) for communicating touch events communicated to it by operating system 3050 to hosted application 3052. In addition to any information conveyed to the hosting application 3051 by the operating system 3050 when a touch event occurs, a touch event communicated by the hosting application 3051 to the hosted application 3052 may indicate particular GUI elements to which the touch event was directed. Such GUI elements may correspond to chart elements displayed on the touch screen 112 such as columns, portions of stacked columns, bars, portions of stacked bars, legends, pie chart slices, category labels, sub-category labels, horizontal axes, vertical axes, and others.

In response to receiving touch events, the hosted application 3052 processes the touch events by instructing the hosting application 3051 to update the display of chart GUI elements displayed on the touch screen 112 in accordance with the data visualization manipulations described above. In one embodiment, chart GUI elements are updated by the hosted application 3052 using drawing commands supported by the hosting application 3051. Such drawing commands may include, but are not limited, to HTML 5 Canvas drawing commands, Vector Markup Language (VML) drawing commands, Scalable Vector Graphics (SVG) drawing commands, and other similar drawing commands presently known or developed in the future.

A benefit of the device configuration of FIG. 30 is that, in response to a touch gesture to a touch screen 112 of the electronic device 100, view manipulation of a data visualization can be accomplished without the need to carry out a request-response round trip over a data network from the device 100 to a server device on the data network and then back to the electronic device 100. In some embodiments of the invention, this round-trip-less view manipulation of the data visualization is accomplished locally at the electronic device, at least in part, by the hosted application 3052 responding to touch events that it receives notification of from the hosting application 3051 and updating the display of the data visualization by issuing drawing commands (e.g., HTML 5 Canvas, VML, or SVG commands) to the hosting application 3051 in response to receiving the notification of the touch events.

6.0 Extensions and Alternatives

In the foregoing specification, embodiments of the present invention have been described with reference to numerous specific details that may vary from implementation to implementation. Thus, the sole and exclusive indicator of what is the invention, and is intended by Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    at an electronic device comprising or operatively coupled to a touch screen:
    displaying on the touch screen in a first display state a column or bar chart comprising a horizontal axis and a vertical axis
    while the chart is in the first display state, detecting an orientation of a touch gesture directed to the touch screen;
    wherein detecting the orientation of the touch gesture comprises detecting whether the touch gesture has a vertical orientation or a horizontal orientation;
    wherein detecting whether the touch gesture has a vertical orientation or a horizontal orientation is based on an angular measurement of a circle defined by two contact points of the touch gesture wherein one of the two contact points is considered the center of the circle; and
    in response to detecting the touch gesture, changing, based on the detected orientation, display of the chart to a second display state;
    wherein if the touch gesture has a vertical orientation, then the changing display step comprises zooming display of the vertical axis of the chart while maintaining display of the horizontal axis in a display state corresponding to or substantially corresponding to the first display state of the horizontal axis; or
    wherein if the touch gesture has a horizontal orientation, then the changing display step comprises zooming display of the horizontal axis of the chart while maintaining display of the vertical axis in a display state corresponding to or substantially corresponding to the first display state of the vertical axis.

2. The computer-implemented method of claim 1, wherein:
    the chart is a column chart displaying a number of columns, each column having a corresponding vertical display height and a corresponding horizontal display width on the touch screen in the first display state;
    the touch gesture is a pinch gesture;
    zooming display comprises zooming display of the vertical axis of the column chart;
    zooming display of the vertical axis of the column chart comprises shortening the vertical display height of each of the number of columns; and
    maintaining display of the horizontal axis comprises maintaining or substantially maintaining the horizontal display width of each of the number of columns.

3. The computer-implemented method of claim 1, wherein:
    the chart is a column chart displaying a number of columns, each column having a corresponding vertical display height and a corresponding horizontal display width on the touch screen in the first display state;
    the touch gesture is a spread gesture;
    zooming display comprises zooming display of the vertical axis of the column chart;
    zooming display of the vertical axis of the column chart comprises increasing the vertical display height of each of the number of columns; and
    maintaining display of the horizontal axis comprises maintaining or substantially maintaining the horizontal display width of each of the number of columns.

4. The computer-implemented method of claim 1, wherein:
    the chart is a column chart displaying a number of columns, each column having a corresponding vertical display height and a corresponding horizontal display width on the touch screen in the first display state;
    the touch gesture is a pinch gesture;
    zooming display comprises zooming display of the horizontal axis of the column chart;
    zooming display of the horizontal axis of the column chart comprises narrowing the horizontal display width of each of the number of columns; and
    maintaining display of the vertical axis comprises maintaining or substantially maintaining the vertical display height of each of the number of columns.

5. The computer-implemented method of claim 1, wherein:
    the chart is a column chart displaying a number of columns, each column having a corresponding vertical display height and a corresponding horizontal display width on the touch screen in the first display state;
    the touch gesture is a spread gesture;
    zooming display comprises zooming display of the horizontal axis of the column chart;
    zooming display of the horizontal axis of the column chart comprises widening the horizontal display width of each of the number of columns; and
    maintaining display of the vertical axis comprises maintaining or substantially maintaining the vertical display height of each of the number of columns.

6. The computer-implemented method of claim 1, wherein displaying the chart in the first display state comprises drawing at least a portion of the chart in the first display state using programmatic drawing instructions for drawing graphics on a web page.

7. The computer-implemented method of claim 1, wherein changing display of the chart to the second display state comprises updating display of at least a portion of the chart in the first display state using programmatic drawing instructions for drawing graphics on a web page.

8. The computer-implemented method of claim 1, wherein displaying the chart in the first display state comprises drawing at least a portion of the chart in the first display state using programmatic drawing instructions compliant with a programmatic drawing instruction specification selected from the group consisting of a Hypertext Markup Language (HTML) specification, a Scalable Vector Graphics (SVG) specification, or a Vector Markup Language (VML) specification.

9. The computer-implemented method of claim 1, wherein changing display of the chart to the second display state comprises updating display of at least a portion of the chart in the first display state using programmatic drawing instructions compliant with a programmatic drawing instruction specification selected from the group consisting of a Hypertext Markup Language (HTML) specification, a Scalable Vector Graphics (SVG) specification, or a Vector Markup Language (VML) specification.

10. The computer-implemented method of claim 1, wherein displaying the chart in the first display state comprises displaying the chart in the first display state on a web page.

11. The computer-implemented method of claim 1, wherein detecting the touch gesture comprises receiving one or more touch event notifications from a hosting application or an operating system.

12. The computer-implemented method of claim 1, wherein the electronic device is a mobile phone or tablet computing device.

13. The computer-implemented method of claim 1, wherein:
 the chart is a bar chart displaying a number of bars, each bar having a corresponding horizontal display height and a corresponding vertical display width on the touch screen in the first display state;
 the touch gesture is a pinch gesture;
 zooming display comprises zooming display of the vertical axis of the bar chart;
 zooming display of the vertical axis of the bar chart comprises narrowing the vertical display width of each of the number of bars; and
 maintaining display of the horizontal axis comprises maintaining or substantially maintaining the horizontal display height of each of the number of bars.

14. The computer-implemented method of claim 1, wherein:
 the chart is a bar chart displaying a number of bars, each bar having a corresponding horizontal display height and a corresponding vertical display width on the touch screen in the first display state;
 the touch gesture is a spread gesture;
 zooming display comprises zooming display of the vertical axis of the bar chart;
 zooming display of the vertical axis of the bar chart comprises widening the vertical display width of each of the number of bars; and
 maintaining display of the horizontal axis comprises maintaining or substantially maintaining the horizontal display height of each of the number of bars.

15. The computer-implemented method of claim 1, wherein:
 the chart is a bar chart displaying a number of bars, each bar having a corresponding horizontal display height and a corresponding vertical display width on the touch screen in the first display state;
 the touch gesture is a pinch gesture;
 zooming display comprises zooming display of the horizontal axis of the bar chart;
 zooming display of the horizontal axis of the bar chart comprises shortening the horizontal display height of each of the number of bars; and
 maintaining display of the horizontal axis comprises maintaining or substantially maintaining the vertical display width of each of the number of bars.

16. The computer-implemented method of claim 1, wherein:
 the chart is a bar chart displaying a number of bar, each bar having a corresponding horizontal display height and a corresponding vertical display width on the touch screen in the first display state;
 the touch gesture is a spread gesture;
 zooming display comprises zooming display of the horizontal axis of the bar chart;
 zooming display of the horizontal axis of the bar chart comprises increasing the horizontal display height of each of the number of bars; and
 maintaining display of the vertical axis comprises maintaining or substantially maintaining the vertical display width of each of the number of bars.

17. The computer-implemented method of claim 1, wherein changing display of the chart to the second display state comprises animating the zoom of the horizontal or vertical axis from the first display state to the second display state.

18. The computer-implemented method of claim 1, wherein:
 the chart is a column chart;
 the vertical axis of the column chart visually represents to a first range of values in the first display state;
 the horizontal axis of the column chart visually represents a number of categories;
 the touch gesture is a pinch gesture;
 zooming display comprises zooming display of the vertical axis of the column chart;
 zooming display of the vertical axis of the column chart comprises changing display of the vertical axis to visually represent a second range of values that is wider than the first range of values and includes the first range of values; and
 maintaining display of the horizontal axis comprises maintaining the number of categories that the horizontal axis visually represents.

19. The computer-implemented method of claim 1, wherein:
 the chart is a column chart;
 the vertical axis of the column chart visually represents to a first range of values in the first display state;
 the horizontal axis of the column chart visually represents a number of categories;
 the touch gesture is a spread gesture;
 zooming display comprises zooming display of the vertical axis of the column chart;
 zooming display of the vertical axis of the column chart comprises changing display of the vertical axis to visually represent a second range of values that is narrower than the first range of values; and
 maintaining display of the horizontal axis comprises maintaining the number of categories that the horizontal axis visually represents.

20. The computer-implemented method of claim 1, wherein:
 the chart is a column chart;
 the vertical axis of the column chart visually represents to a range of values in the first display state;
 the horizontal axis of the column chart visually represents a first number of categories;
 the touch gesture is a pinch gesture;
 zooming display comprises zooming display of the horizontal axis of the column chart;
 zooming display of the horizontal axis of the column chart comprises changing display of the horizontal axis to visually represent a second number of categories that is greater than the first number of categories; and
 maintaining display of the vertical axis comprises maintaining the range of values that the vertical axis visually represents.

21. The computer-implemented method of claim 1, wherein:

the chart is a column chart;

the vertical axis of the column chart visually represents to a range of values in the first display state;

the horizontal axis of the column chart visually represents a first number of categories;

the touch gesture is a spread gesture;

zooming display comprises zooming display of the horizontal axis of the column chart;

zooming display of the horizontal axis of the column chart comprises changing display of the horizontal axis to visually represent a second number of categories that is fewer than the first number of categories; and maintaining display of the vertical axis comprises maintaining the range of values that the vertical axis visually represents.

22. The computer-implemented method of claim 1, wherein:

the chart is a bar chart;

the horizontal axis of the bar chart visually represents to a first range of values in the first display state;

the vertical axis of the bar chart visually represents a number of categories;

the touch gesture is a pinch gesture;

zooming display comprises zooming display of the horizontal axis of the bar chart;

zooming display of the horizontal axis of the bar chart comprises changing display of the horizontal axis to visually represent a second range of values that is wider than the first range of values and includes the first range of values; and maintaining display of the vertical axis comprises maintaining the number of categories that the vertical axis visually represents.

23. The computer-implemented method of claim 1, wherein:

the chart is a bar chart;

the horizontal axis of the bar chart visually represents to a first range of values in the first display state;

the vertical axis of the bar chart visually represents a number of categories;

the touch gesture is a spread gesture;

zooming display comprises zooming display of the horizontal axis of the bar chart;

zooming display of the horizontal axis of the bar chart comprises changing display of the horizontal axis to visually represent a second range of values that is narrower than the first range of values; and maintaining display of the vertical axis comprises maintaining the number of categories that the vertical axis visually represents.

24. The computer-implemented method of claim 1, wherein:

the chart is a bar chart;

the horizontal axis of the bar chart visually represents to a range of values in the first display state;

the vertical axis of the bar chart visually represents a first number of categories;

the touch gesture is a pinch gesture;

zooming display comprises zooming display of the vertical axis of the bar chart;

zooming display of the vertical axis of the bar chart comprises changing display of the vertical axis to visually represent a second number of categories that is greater than the first number of categories; and maintaining display of the horizontal axis comprises maintaining the range of values that the horizontal axis visually represents.

25. The computer-implemented method of claim 1, wherein:

the chart is a bar chart;

the horizontal axis of the bar chart visually represents to a range of values in the first display state;

the vertical axis of the bar chart visually represents a first number of categories;

the touch gesture is a spread gesture;

zooming display comprises zooming display of the vertical axis of the bar chart;

zooming display of the vertical axis of the column chart comprises changing display of the vertical axis to visually represent a second number of categories that is fewer than the first number of categories; and maintaining display of the horizontal axis comprises maintaining the range of values that the horizontal axis visually represents.

26. The computer-implemented method of claim 1, wherein displaying the chart in the first display state comprises displaying the chart on the touch screen so that it occupies less than all of the touch screen display area.

27. The computer-implemented method of claim 1, wherein the touch gesture is performed by a user of the electronic device with the user's fingers.

28. The computer-implemented method of claim 1, wherein the horizontal axis and the vertical axis each comprise a number of labels.

29. One or more non-transitory computer-readable media storing instructions which, when executed by an electronic device comprising or operatively coupled to a touch screen, cause performance of a method comprising:

displaying on the touch screen in a first display state a column or bar chart comprising a horizontal axis and a vertical axis while the chart is in the first display state, detecting an orientation of a touch gesture directed to the touch screen;

wherein detecting the orientation of the touch gesture comprises detecting whether the touch gesture has a vertical orientation or a horizontal orientation;

wherein detecting whether the touch gesture has a vertical orientation or a horizontal orientation is based on an angular measurement of a circle defined by two contact points of the touch gesture wherein one of the two contact points is considered the center of the circle; and in response to detecting the touch gesture, changing, based on the detected orientation, display of the chart to a second display state;

wherein if the touch gesture has a vertical orientation, then the changing display step comprises zooming display of the vertical axis of the chart while maintaining display of the horizontal axis in a display state corresponding to or substantially corresponding to the first display state of the horizontal axis; or wherein if the touch gesture has a horizontal orientation, then the changing display step comprises zooming display of the horizontal axis of the chart while maintaining display of the vertical axis in a display state corresponding to or substantially corresponding to the first display state of the vertical axis.

30. A device comprising:

a touch screen;

one or more processors;

memory; and one or more programs stored in the memory and when executed by the one or more processors cause performance of a method comprising:

displaying on the touch screen in a first display state a column or bar chart comprising a horizontal axis and a vertical axis while the chart is in the first display state, detecting an orientation of a touch gesture directed to the touch screen;

wherein detecting the orientation of the touch gesture comprises detecting whether the touch gesture has a vertical orientation or a horizontal orientation;

wherein detecting whether the touch gesture has a vertical orientation or a horizontal orientation is based on an angular measurement of a circle defined by two contact points of the touch gesture wherein one of the two contact points is considered the center of the circle; and in response to detecting the touch gesture, changing, based on the detected orientation, display of the chart to a second display state;

wherein if the touch gesture has a vertical orientation, then the changing display step comprises zooming display of the vertical axis of the chart while maintaining display of the horizontal axis in a display state corresponding to or substantially corresponding to the first display state of the horizontal axis; or wherein if the touch gesture has a horizontal orientation, then the changing display step comprises zooming display of the horizontal axis of the chart while maintaining display of the vertical axis in a display state corresponding to or substantially corresponding to the first display state of the vertical axis.

* * * * *